(12) United States Patent
Jozuka et al.

(10) Patent No.: US 11,168,236 B2
(45) Date of Patent: Nov. 9, 2021

(54) ACRYLIC PRESSURE-SENSITIVE ADHESIVE COMPOSITION AND PRESSURE-SENSITIVE ADHESIVE SHEET

(71) Applicant: NITTO DENKO CORPORATION, Ibaraki (JP)

(72) Inventors: Kenta Jozuka, Ibaraki (JP); Naoaki Higuchi, Ibaraki (JP); Kenji Furuta, Ibaraki (JP); Naohiro Kato, Ibaraki (JP); Yasushi Buzojima, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 41 days.

(21) Appl. No.: 16/152,776

(22) Filed: Oct. 5, 2018

(65) Prior Publication Data
US 2019/0106608 A1    Apr. 11, 2019

(30) Foreign Application Priority Data

Oct. 6, 2017 (JP) .............................. JP2017-196393
Apr. 4, 2018 (JP) .............................. JP2018-072641

(51) Int. Cl.
| | | |
|---|---|---|
| *C09J 133/08* | (2006.01) | |
| *C09J 7/38* | (2018.01) | |
| *C08F 220/18* | (2006.01) | |
| *C09J 133/10* | (2006.01) | |
| *C09J 133/12* | (2006.01) | |
| *C09J 11/08* | (2006.01) | |
| *C09J 133/00* | (2006.01) | |

(52) U.S. Cl.
CPC ............ *C09J 133/08* (2013.01); *C08F 220/18* (2013.01); *C09J 7/385* (2018.01); *C09J 11/08* (2013.01); *C09J 133/00* (2013.01); *C09J 133/10* (2013.01); *C09J 133/12* (2013.01); *C09J 2203/326* (2013.01); *C09J 2433/00* (2013.01)

(58) Field of Classification Search
CPC ........... C09J 7/38; C09J 133/08; C08F 220/18
USPC ........................................................ 524/311
See application file for complete search history.

(56) References Cited

U.S. PATENT DOCUMENTS

| | | | |
|---|---|---|---|
| 2006/0162857 A1 | 7/2006 | Nagamoto et al. | |
| 2007/0166537 A1 | 7/2007 | Nagamoto et al. | |
| 2011/0152564 A1* | 6/2011 | Fujiwara | B01F 7/00208 560/85 |
| 2011/0217542 A1* | 9/2011 | Moroishi | C09J 133/06 428/323 |
| 2012/0055700 A1* | 3/2012 | Horiguchi | C09J 7/385 174/254 |
| 2013/0017389 A1* | 1/2013 | Tamura | C09J 7/26 428/314.4 |
| 2013/0095309 A1 | 4/2013 | Suzuki et al. | |
| 2017/0232720 A1* | 8/2017 | Nishikawa | C09J 7/385 428/213 |

FOREIGN PATENT DOCUMENTS

| | | | |
|---|---|---|---|
| CN | 102399503 A | | 4/2012 |
| CN | 102666767 A | | 9/2012 |
| CN | 106459706 A | | 2/2017 |
| CN | 106995670 A | | 8/2017 |
| EP | 3 147 339 A1 | | 3/2017 |
| JP | 2010132891 | * | 6/2010 |
| JP | 2013-100485 A | | 5/2013 |
| JP | 2015-147873 A | | 8/2015 |
| JP | 639076 | * | 5/2016 |
| JP | 2017-002292 A | | 1/2017 |
| JP | 2017-132911 A | | 8/2017 |
| WO | 2009/069799 A1 | | 6/2009 |
| WO | 2011/075501 A2 | | 6/2011 |
| WO | WO2016/021373 | * | 2/2016 |

OTHER PUBLICATIONS

Extended European Search Report dated Dec. 13, 2018 issued by the European Patent Office in counterpart application No. 18198680.3.
First Office Action dated May 10, 2021 by the Chinese Patent Office in Chinese Application No. 201811156040.X.

* cited by examiner

*Primary Examiner* — Deve V Hall
(74) *Attorney, Agent, or Firm* — Sughrue Mion, PLLC

(57) ABSTRACT

The present invention provides an acrylic PSA composition. The acrylic PSA composition comprises an acrylic polymer as its base polymer and at least one species selected among tackifier resins and (meth)acrylic oligomers. The acrylic polymer has a weight average molecular weight higher than $70 \times 10^4$. The acrylic polymer has a dispersity (Mw/Mn) below 15.

15 Claims, 3 Drawing Sheets

[Fig. 1]
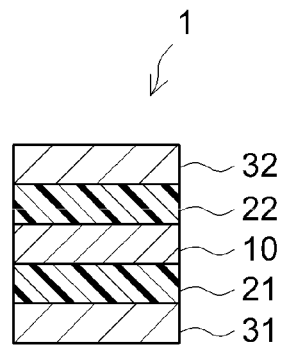
[Fig. 2]
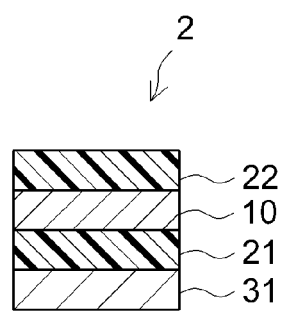
[Fig. 3]
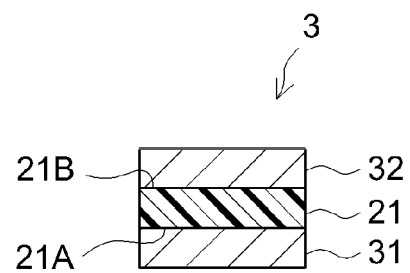

[Fig. 4]
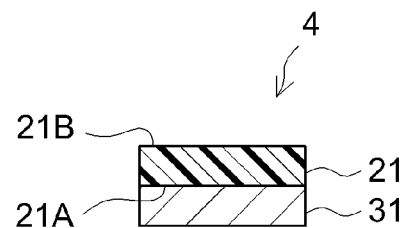
[Fig. 5]
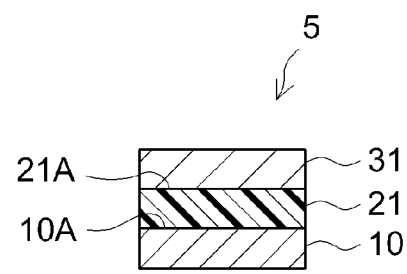
[Fig. 6]
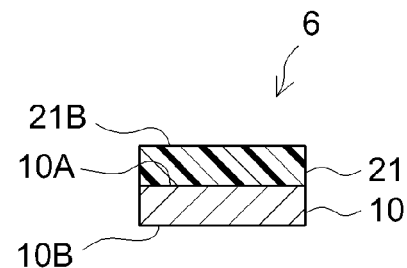

[Fig. 7(a)]
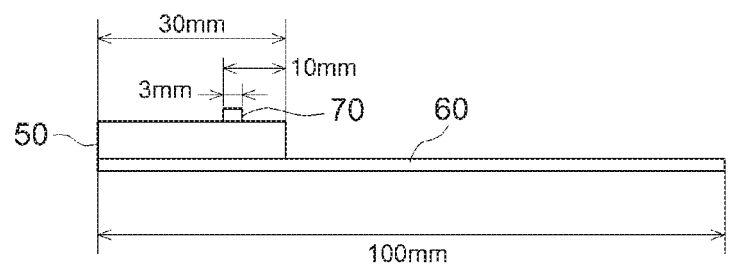
[Fig. 7(b)]
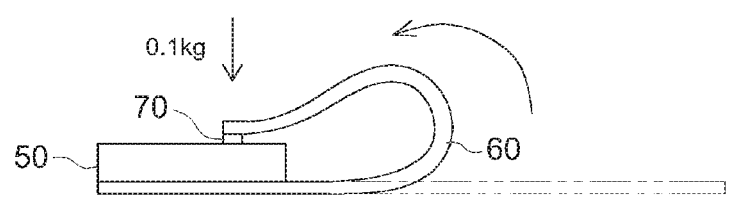
[Fig. 7(c)]
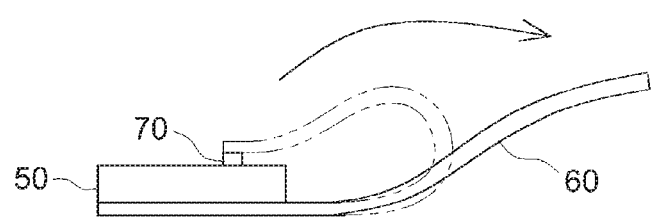

ACRYLIC PRESSURE-SENSITIVE ADHESIVE COMPOSITION AND PRESSURE-SENSITIVE ADHESIVE SHEET

CROSS-REFERENCE

The present application claims priority to Japanese Patent Application No. 2017-196393 filed on Oct. 6, 2017 and No. 2018-072641 filed on Apr. 4, 2018; the entire content thereof is incorporated herein by reference.

BACKGROUND OF THE INVENTION

Field of the Invention

The present invention relates to an acrylic pressure-sensitive adhesive composition and a pressure-sensitive adhesive sheet.

Description of the Related Art

In general, pressure-sensitive adhesive (PSA) exists as a soft solid (a viscoelastic material) in a room temperature range and has a property to adhere easily to adherend with some pressure applied. Because of such properties, PSA has been widely used as, for instance, an on-substrate PSA sheet having a PSA layer on a support substrate or a substrate-free PSA sheet with no support substrate, for purposes such as bonding, fixing and protecting parts in smartphones and other mobile electronics. Technical documents related to double-faced PSA tape used in fixing parts of mobile electronics include Japanese Patent Application Publication No. 2017-132911, Japanese Patent Application Publication No. 2013-100485, Japanese Patent Application Publication No. 2017-002292 and Japanese Patent Application Publication No. 2015-147873.

SUMMARY OF THE INVENTION

When fixing parts with PSA sheets in mobile electronics, bonding areas are usually small due to limiting factors such as size and weight. PSA sheets used for this purpose need to have adhesive strength capable of achieving good fastening even onto small areas, calling for higher levels of properties that are necessary to meet demand for weight reduction and downsizing. In particular, with respect to mobile electronics with touch displays typified by smartphones, while products themselves are becoming smaller and thinner, their displays are becoming larger for their visibility and ease of navigation; because of these unique circumstances, the PSA is required to provide adhesive bonding performance under harsher conditions. More specifically, in this application, besides limited bonding areas, for instance, flexible parts such as flexible printed circuits (FPC) are folded, placed in limited internal spaces in mobile electronics, precisely positioned and stably fixed with PSA sheets. PSA used for fixing such parts is required to have deformation resistance capable of continuously resisting elastic repulsion of these parts. In this type of fixing, PSA sheets receive continuous peel/deformation loads in its thickness direction (or its z-axis direction). Currently, the degree of crosslinking in PSA is increased to improve cohesion; in addition, required performance is obtained by adhesive fixing under high pressure, assuring enough time to cure, etc.

On the other hand, in view of increasing productivity of manufacturing products such as electronics and reducing the production cost, the tact time (work time) is the first thing to look at. The PSA sheet to be used is required to provide easy bonding under light pressure as well as expected performance in a shorter curing time. For this, it needs to show good adhesive strength immediately after its application. The degree of crosslinking can be lowered to improve the initial adhesive strength; however, a lower degree of crosslinking in PSA usually leads to lower cohesive strength and thus the PSA will suffer a decrease in deformation resistance to external force. For a support purpose requiring continuous performance, another problem is cohesive failure caused by lack of load-bearing ability. Other choices include a method that uses thermal press-bonding; however, when heating at elevated temperatures, such as above 60° C., applications will be significantly limited. In addition, it may have a tendency of compromising the handling as compared to press-bonding at room temperature. In summary, the light-pressure initial adhesion for tact time reduction is in an opposing relationship to the continuous deformation resistance required for fixing parts of current mobile electronics, making them hard to combine. In an application that requires a PSA sheet to have deformation resistance to a continuous peel load applied in its thickness direction, it will be very meaningful to provide a PSA sheet that exhibits sufficient adhesion immediately after its application even in an embodiment where it is applied under light pressure (light-pressure initial adhesion) and is also capable of resisting deformation against a continuous peel load applied in its thickness direction (having deformation resistance to a continuous z-axial load), for it will lead to greater productivity of manufacturing high-performance, high-spec products.

The present invention has been made in view of such circumstances with an objective to provide an acrylic PSA composition capable of achieving both light-pressure initial adhesion and deformation resistance to a continuous z-axial load, without the need of high-temperature thermal press-bonding. Another objective of this invention is to provide a PSA sheet capable of achieving both light-pressure initial adhesion and deformation resistance to a continuous z-axial load, without the need of high-temperature thermal press-bonding.

The present description provides an acrylic PSA composition. The acrylic PSA composition comprises an acrylic polymer as its base polymer and at least one species selected among tackifier resins and (meth)acrylic oligomers. The acrylic polymer has a weight average molecular weight higher than $70 \times 10^4$. The acrylic polymer has a dispersity (Mw/Mn) below 15.

With the use of the acrylic polymer having a weight average molecular weight (Mw) higher than $70 \times 10^4$ and a Mw/Mn value below 15 as the base polymer, its relatively uniform polymer accurately manifest cohesion to obtain excellent resistance to a continuous deformation load (deformation resistance). In addition to the acrylic polymer, with the use of at least one species selected among tackifier resins and (meth)acrylic oligomers, sufficient adhesive properties are manifested immediately after its application even in an embodiment where it is applied by light press-bonding. In other words, according to the PSA composition, a PSA sheet that combines light-pressure initial adhesion and deformation resistance to a continuous z-axial load is obtained. Even by light press-bonding, the PSA sheet formed from the PSA composition can fix an elastic adherend in a folded position and continuously hold it fixed in the same position. The PSA sheet with excellent light-pressure initial adhesion is also advantageous as it is easily applied to brittle adherends that may be damaged by typical press-bonding.

In a preferable embodiment of the art disclosed herein (including the acrylic PSA composition and the PSA sheet; the same applies hereinafter), the acrylic polymer includes at least 50% (by weight) alkyl (meth)acrylate copolymerized therein, with the alkyl (meth)acrylate having an alkyl group with 1 up to 6 carbon atoms at its ester terminus. Having such constitution, a PSA sheet that provides both light-pressure initial adhesion and deformation resistance to a continuous z-axial load can be preferably obtained.

In a preferable embodiment of the art disclosed herein, the acrylic polymer includes an acidic group-containing monomer copolymerized therein. The acidic group-containing monomer introduced in the polymer enhances cohesion based on its polarity and provides bonding strength to a polar adherend. As a result, even in an embodiment where it is applied by light press-bonding, it preferably exhibits sufficient adhesion immediately after its application and is less likely to deform under a continuous peel load applied in its thickness direction. The copolymerization ratio of the acidic group-containing monomer in the acrylic polymer is preferably lower than 10% by weight. When the copolymerization ratio of the acidic group-containing monomer is lower than 10% by weight, while suitably controlling the effect (cohesiveness, crosslinking points, etc.) of the acidic group-containing monomer, good light-pressure initial adhesion can be retained. It is more preferable to use acrylic acid as the acidic group-containing monomer. The use of acrylic acid as the acidic group-containing monomer can favorably achieve both light-pressure initial adhesion and deformation resistance to a continuous z-axial load.

In a preferable embodiment of the art disclosed herein, the tackifier resin is included at a ratio lower than 30 parts by weight to 100 parts by weight of the acrylic polymer. The use of the tackifier resin in the prescribed amount can preferably bring about greater light-pressure initial adhesion while the high molecular weight acrylic polymer assures deformation resistance to a continuous z-axial load.

In a preferable embodiment of the art disclosed herein, the (meth)acrylic oligomer is included at a ratio lower than 30 parts by weight to 100 parts by weight of the acrylic polymer. The use of the (meth)acrylic oligomer in the prescribed amount can preferably bring about excellent light-pressure initial adhesion while providing excellent deformation resistance to a continuous z-axial load even in an application exposed to harsher conditions such as strong repulsion.

A preferable embodiment of the art disclosed herein includes both the tackifier resin and the (meth)acrylic oligomer. With the combined use of the tackifier resin and the (meth)acrylic oligomer in a composition that comprises a high molecular weight acrylic polymer, excellent light-pressure initial adhesion can be obtained while obtaining excellent deformation resistance to a continuous z-axial load even in an application exposed to harsher conditions such as strong repulsion.

This description also provides a PSA sheet comprising an acrylic PSA layer. The acrylic PSA layer includes an acrylic polymer as its base polymer and at least one species selected among tackifier resins and (meth)acrylic oligomers. The acrylic polymer has a weight average molecular weight higher than $70 \times 10^4$. The acrylic polymer has a dispersity (Mw/Mn) below 15. The PSA sheet having such constitution can achieve both light-pressure initial adhesion and deformation resistance to a continuous z-axial load.

The present description provides a PSA sheet comprising a PSA layer. The PSA layer has a storage modulus at 25° C., G'(25° C.), of 0.15 MPa or greater and a storage modulus at 85° C., G'(85° C.), of 0.02 MPa or greater. It also satisfies at least one of the following features: having a 180° peel strength of 8 N/20 mm or greater when determined within one minute after press-bonded at 23° C. at a press-bonding load of 0.1 kg (23° C. light-pressure initial adhesive strength) or a 180° peel strength of 8 N/20 mm or greater when determined within one minute after press-bonded at 40° C. at 0.05 MPa for 3 seconds (40° C. light-pressure initial adhesive strength).

The PSA layer has storage moduli G'(25° C.) and G'(85° C.) of at least 0.15 MPa and at least 0.02 MPa, respectively; and therefore, it is less likely to deform under a load applied initially and continuously upon its application. The PSA sheet exhibits at least either a 23° C. light-pressure initial adhesive strength or a 40° C. light-pressure initial adhesive strength of 8 N/20 mm or greater. The PSA sheet having such 23° C. light-pressure initial adhesive strength may show excellent initial adhesion to an adherend surface when lightly press-bonded at around room temperature. Even when the 23° C. light-pressure initial adhesive strength is not satisfied, if the PSA sheet has a 40° C. light-pressure initial adhesive strength of 8 N/20 mm or greater, excellent initial adhesion to an adherend surface can be obtained, for instance, by light press-bonding with limited heating (mild heating at a temperature below 60° C., typically around 40° C.) that can be applied to electronics. In an embodiment of application where it is lightly press-bonded at around room temperature or at a limited heating temperature, the PSA sheet having such constitution shows sufficient adhesion immediately after its application and is less likely to deform under a continuous peel load applied in its thickness direction. In other words, the present description provides a PSA sheet capable of achieving both light-pressure initial adhesion and deformation resistance to a continuous z-axial load, without the need of high-temperature thermal press-bonding. According to such a PSA sheet, even by light press-bonding, an elastic adherend can be fixed in a folded position and continuously held fixed in the same position. Such a PSA sheet can be preferably fabricated by using an acrylic PSA composition disclosed herein.

In a preferable embodiment of the PSA sheet disclosed herein, the PSA layer has a gel fraction of 40% by weight or higher. According to the PSA having a gel fraction of 40% by weight or higher, deformation resistance can be more favorably obtained against a continuous z-axial load.

In a preferable embodiment of the PSA sheet disclosed herein, the PSA layer is an acrylic PSA layer comprising an acrylic polymer. With the use of acrylic polymer which allows a wide range of molecular design choices and relatively easy design, the PSA sheet combining light-pressure initial adhesion and deformation resistance to a continuous z-axial load can be favorably fabricated.

In a preferable embodiment of the PSA sheet disclosed herein, the acrylic polymer is crosslinked. The crosslinked acrylic polymer leads to greater cohesion of the PSA, giving rise to more preferable deformation resistance to a continuous z-axial load.

The PSA sheet disclosed herein shows light-pressure initial adhesion. Thus, for instance, it can reduce the tact time in manufacturing electronics. When the PSA sheet is used for fixing parts in mobile electronics, it may contribute to an increase in productivity of manufacturing the mobile electronics. Alternatively, the PSA sheet disclosed herein is preferably used for fixing elastic adherends such as FPC because it has deformation resistance to a continuous z-axial load. According to the PSA sheet, even by light press-bonding, an elastic adherend can be fixed in a folded position and continuously held fixed in the same position. For instance, the PSA sheet disclosed herein can be used for fixing FPC placed in mobile electronics so as to simultaneously improve efficiency of installing parts thereof and productivity of their production.

BRIEF DESCRIPTION OF THE DRAWINGS

FIG. 1 shows a cross-sectional diagram schematically illustrating an example of configuration of the PSA sheet.

FIG. 2 shows a cross-sectional diagram schematically illustrating another example of configuration of the PSA sheet.

FIG. 3 shows a cross-sectional diagram schematically illustrating another example of configuration of the PSA sheet.

FIG. 4 shows a cross-sectional diagram schematically illustrating another example of configuration of the PSA sheet.

FIG. 5 shows a cross-sectional diagram schematically illustrating another example of configuration of the PSA sheet.

FIG. 6 shows a cross-sectional diagram schematically illustrating another example of configuration of the PSA sheet.

FIGS. 7(a), 7(b) and 7(c) show a schematic diagram illustrating the z-axial deformation test method.

DETAILED DESCRIPTION OF THE INVENTION

Preferred embodiments of the present invention are described below. Matters necessary to practice this invention other than those specifically referred to in this description can be understood by a person skilled in the art based on the disclosure about implementing the invention in this description and common general knowledge at the time of application. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent accurate sizes or reduction scales of the PSA sheet of this invention that is actually provided as a product.

As used herein, the term "PSA" refers to, as described earlier, a material that exists as a soft solid (a viscoelastic material) in a room temperature range and has a property to adhere easily to adherend with some pressure applied. As defined in "Adhesion: Fundamental and Practice" by C. A. Dahlquist (McLaren & Sons (1966), P. 143), PSA referred to herein can be a material that has a property satisfying complex tensile modulus $E^*(1\ Hz)<10^7$ dyne/cm$^2$ (typically, a material that exhibits the described characteristics at 25° C.).

As used herein, the term "(meth)acryloyl" comprehensively refers to acryloyl and methacryloyl. Similarly, the term "(meth)acrylate" comprehensively refers to acrylate and methacrylate, and the term "(meth)acryl" comprehensively refers to acryl and methacryl.

As used herein, the term "acrylic polymer" refers to a polymer comprising, as a monomeric unit constituting the polymer, a monomeric unit derived from a monomer having at least one (meth)acryloyl group per molecule. Hereinafter, a monomer having at least one (meth)acryloyl group per molecule is referred to as "acrylic monomer" as well. As used herein, the acrylic polymer is defined as a polymer comprising a monomeric unit derived from an acrylic monomer.

The PSA sheet disclosed herein can be an on-substrate PSA sheet formed to have the PSA layer on one or each face of a substrate (support substrate) or a substrate-free PSA sheet having a form where the PSA layer is held on a release liner, or like form. The concept of PSA sheet herein may encompass so-called PSA tape, PSA labels, PSA film, etc. The PSA sheet disclosed herein can be in a roll or in a flat sheet. Alternatively, the PSA sheet may be processed into various shapes.

The PSA disclosed herein may have, for example, cross-sectional constitutions schematically illustrated in FIG. 1 to FIG. 6. Among these, FIG. 1 and FIG. 2 show examples of constitutions of an adhesively double-faced on-substrate PSA sheet. Double-faced PSA sheet 1 illustrated in FIG. 1 has a constitution in which PSA layers 21 and 22 are provided, respectively, on two faces (both non-releasable) of a substrate 10 and the PSA layers 21 and 22 are protected, respectively, with release liners 31 and 32. Double-faced PSA sheet 2 illustrated in FIG. 2 has a constitution in which PSA layers 21 and 22 are provided, respectively, on two faces (both non-releasable) of a substrate 10 and PSA layer 21 as one of the two is protected with a release liner 31 having a release surface on each face. This type of PSA sheet 2 can be configured so that PSA layer 22 is also protected with release liner 31 by winding the PSA sheet to allow the other PSA layer 22 to contact the back face of release liner 31.

FIG. 3 and FIG. 4 show examples of constitution of a substrate-free double-faced PSA sheet. PSA sheet 3 illustrated in FIG. 3 has a constitution in which two faces 21A and 21B of a substrate-free PSA layer 21 are protected, respectively, with release liners 31 and 32 each having a release surface at least on the PSA layer side. PSA sheet 4 illustrated in FIG. 4 has a constitution such that one surface (adhesive face) 21A of a substrate-free PSA layer 21 is protected with a release liner 31 having a release surface on each face; and when this is wound, the other surface (adhesive face) 21B of PSA layer 21 contacts the back face of release liner 31 so that the other surface 21B is also protected with release liner 31.

FIG. 5 and FIG. 6 show examples of constitutions of an adhesively single-faced on-substrate PSA sheet. PSA sheet 5 illustrated in FIG. 5 has a constitution in which a PSA layer 21 is provided on a surface 10A (non-releasable) of a substrate 10 and a surface (adhesive face) 21A of the PSA layer 21 is protected with a release liner 31 having a release surface at least on the PSA layer side. PSA sheet 6 illustrated in FIG. 6 has a constitution in which a PSA layer 21 is provided on a face 10A (non-releasable) of a substrate 10. The other face 10B of substrate 10 is a release surface and when PSA sheet 6 is wound, the other face 10B contacts PSA layer 21 so that the face (adhesive face) 21B of the PSA layer is protected with the other face 10B of the substrate.

<Psa Layer>

The PSA layer disclosed herein may typically have a storage modulus at 25° C., G'(25° C.), of 0.15 MPa or greater. According to PSA having such a G'(25° C.) value, in an early stage after its application to adherend, good deformation resistance can be preferably exhibited. The G'(25° C.) is preferably 0.17 MPa or greater, more preferably 0.2 MPa or greater, or yet more preferably 0.23 MPa or greater. The G'(25° C.) is particularly preferably 0.25 MPa or greater; it can also be, for instance, 0.3 MPa or greater. The G'(25° C.) is usually suitably 1.0 MPa or less. From the standpoint of combining light-pressure initial adhesion and deformation resistance, it is preferably 0.6 MPa or less, more preferably 0.4 MPa or less, yet more preferably 0.35 MPa or less; it can also be, for instance, 0.3 MPa or less, 0.25 MPa or less, or even 0.2 MPa or less.

The PSA layer disclosed herein usually suitably exhibits a loss modulus at 25° C., G"(25° C.), of 2.0 MPa or less. The G"(25° C.) is preferably 1.5 MPa or less, more preferably 1.0 MPa or less, or yet more preferably 0.5 MPa or less. The G"(25° C.) can also be 0.3 MPa or less (e.g. 0.25 MPa or less). The G"(25° C.) is usually suitably 0.01 MPa or greater. From the standpoint of the ease of wetting the adherend surface as well as light-pressure initial adhesion, etc., it is preferably 0.05 MPa or greater, more preferably 0.1 MPa or greater, yet more preferably 0.2 MPa or greater; it can also be, for instance, 0.25 MPa or greater.

The loss tangent at 25° C. (tan δ(25° C.)) of the PSA layer disclosed herein can be suitably selected in view of the light-pressure initial adhesion at room temperature and deformation resistance. Here, the tan δ (loss tangent) of a PSA layer refers to the loss modulus G" relative to the storage modulus G' of the PSA (layer). That is, tan δ=G"/G'. Tan δ(25° C.) is suitably, for instance, about 0.3 or greater; from the standpoint of the deformation resistance, it is preferably about 0.5 or greater, more preferably about 0.7 or greater, yet more preferably about 0.8 or greater, or particularly preferably about 0.9 or greater (e.g. about 1 or greater). The tan δ(25° C.) is suitably, for instance, about 3 or less; from the standpoint of the light-pressure initial adhesion, it is preferably about 2 or less, more preferably about 1.5 or less, or yet more preferably about 1.2 or less.

The PSA layer disclosed herein may typically have a storage modulus at 85° C., G'(85° C.), of 0.02 MPa or greater. At such a G'(85° C.) value, continuous deformation resistance can be preferably obtained. The G'(85° C.) value can be 0.022 MPa or greater. The G'(85° C.) is preferably 0.025 MPa or greater, or more preferably 0.027 MPa or greater. The G'(85° C.) is yet more preferably about 0.03 MPa or greater (e.g. 0.035 MPa or greater), particularly preferably 0.04 MPa or greater, or more particularly preferably 0.05 MPa or greater. The G'(85° C.) is usually suitably 1.0 MPa or less, for instance, 0.5 MPa or less, typically 0.1 MPa or less. The G'(85° C.) value can also be 0.05 MPa or less.

The loss tangent at 85° C. (tan δ(85° C.)) of the PSA layer disclosed herein can be suitably selected in view of the continuous deformation resistance. The tan δ(85° C.) is suitably, for instance, about 0.1 or greater, preferably about 0.2 or greater, more preferably about 0.22 or greater, or yet more preferably 0.24 or greater (e.g. 0.25 or greater). The tan δ(85° C.) is suitably, for instance, about 2 or less, preferably about 1 or less, or more preferably about 0.5 or less (e.g. about 0.3 or less).

At a temperature (press-bonding temperature) where the PSA sheet is press-bonded to adherend, the PSA layer disclosed herein preferably has a storage modulus G'(apply) of 0.6 MPa or less. Even when lightly press-bonded, PSA having such a G'(apply) value can wet the adherend surface well to show excellent initial adhesion. The G'(apply) is more preferably 0.4 MPa or less, or yet more preferably 0.35 MPa or less; it can also be, for instance, 0.3 MPa or less, or even 0.25 MPa or less. The G'(apply) can also be, for instance, 0.2 MPa or less. From the standpoint of combining light-pressure initial adhesion and deformation resistance, the G'(apply) is suitably greater than 0.12 MPa, preferably 0.15 MPa or greater, more preferably 0.17 MPa or greater (e.g. 0.2 MPa or greater), or yet more preferably 0.25 MPa or greater; it can also be, for instance, 0.3 MPa or greater. The press-bonding temperature is selected from a range above 0° C. and below 60° C. in view of the ease of press-bonding, temperature management, etc. In case of a PSA sheet used for mobile electronics applications, because of the temperature limitation in these applications, the press-bonding temperature is desirably selected from a range between 20° C. and 45° C. (typically 25° C. or 40° C., favorably 25° C.). Unlike conventional press-bonding carried out at around 100° C., press-bonding in this temperature range is thermal press-bonding that can be applied to electronics and the like.

In the art disclosed herein, the storage moduli G'(25° C.), G'(85° C.), G'(apply), and loss modulus G"(25° C.) as well as tan δ(25° C.) and tan δ(85° C.) of the PSA layer can be determined by dynamic elastic modulus measurement. In particular, several layers of the PSA (the PSA sheet in case of a substrate-free PSA sheet) of interest are layered to fabricate an approximately 2 mm thick PSA layer. A specimen obtained by punching out a disc of 7.9 mm diameter from the PSA layer is fixed between parallel plates. With a rheometer (e.g. ARES available from TA Instruments or a comparable system), dynamic elastic modulus measurement is carried out to determine storage moduli G'(25° C.), G'(85° C.), G'(apply), and loss modulus G"(25° C.) as well as tan δ(25° C.) and tan δ(85° C.).

Measurement mode: shear mode
Temperature range: −70° C. to 150° C.
Heating rate: 5° C./min
Measurement frequency: 1 Hz The same measurement method is also used in the working examples described later. The PSA layer subject to measurement can be formed by applying the corresponding PSA composition in layers and drying or curing them.

(PSA)

In the art disclosed herein, the type of PSA that constitutes the PSA layer is not particularly limited. For example, the PSA layer may be constituted, comprising one, two or more species of PSA selected among various known species of PSA, such as an acrylic PSA, rubber-based PSA (natural rubber-based, synthetic rubber-based, their mixture-based, etc.), silicone-based PSA, polyester-based PSA, urethane-based PSA, polyether-based PSA, polyamide-based PSA, fluorine-based PSA, etc. Herein, the acrylic PSA refers to a PSA comprising a (meth)acrylic polymer as the base polymer (the primary component among polymers, i.e. a component accounting for more than 50% by mass). The same applies to the rubber-based PSA and other PSA. In a PSA layer preferable from the standpoint of the transparency, weatherability, etc., the acrylic PSA content is 50% by weight or greater, more preferably 70% by weight or greater, or yet more preferably 90% by weight or greater. The acrylic PSA content can be greater than 98% by weight, or the PSA layer may be formed essentially of an acrylic PSA.

(Acrylic Polymer)

While no particular limitations are imposed, in a preferable embodiment of the art disclosed herein, the PSA forming the PSA layer and the PSA composition for forming the PSA comprise an acrylic polymer as the base polymer. The acrylic polymer is preferably a polymer of a starting monomer mixture that comprises an alkyl (meth)acrylate as the primary monomer and may further comprise a copolymerizable secondary monomer. Here, the primary monomer refers to a component that accounts for more than 50% by weight of the starting monomers.

As the alkyl (meth)acrylate, for instance, a compound represented by the formula (1) below can be favorably used.

$$CH_2=C(R^1)COOR^2 \qquad (1)$$

Here, $R^1$ in the formula (1) is a hydrogen atom or a methyl group. $R^2$ is an acyclic alkyl group having 1 to 20 carbon atoms (hereinafter, such a range of the number of carbon atoms may be indicated as "$C_{1-20}$"). From the standpoint of the PSA's storage modulus, etc., an alkyl (meth)acrylate wherein $R^2$ is a $C_{1-14}$ acyclic alkyl group is preferable, and an alkyl (meth)acrylate wherein $R^2$ is a $C_{1-10}$ acyclic alkyl group is more preferable. An alkyl (meth)acrylate wherein $R^2$ is a butyl group or a 2-ethylhexyl group is particularly preferable.

Examples of an alkyl (meth)acrylate with $R^2$ being a $C_{1-20}$ acyclic alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. These alkyl (meth)acrylates can be used solely as one species or in a combination of two or more species. Particularly preferable (meth)acrylates include n-butyl acrylate (BA) and 2-ethylhexyl acrylate (2EHA).

The art disclosed herein can be preferably implemented in an embodiment where the monomers forming the acrylic polymer include at least BA or 2EHA and the combined amount of BA and 2EHA accounts for 75% by weight or more (usually 85% by weight or more, e.g. 90% by weight or more, or even 95% by weight or more) of the alkyl (meth)acrylate in the monomers. For instance, the art disclosed herein can be implemented in embodiments where the monomers consist of, as the alkyl (meth)acrylate, solely BA, solely 2EHA, both BA and 2EHA, etc.

When the monomers include both BA and 2EHA, the BA to 2EHA weight ratio (BA/2EHA) is not particularly limited. For instance, it can be 1/99 or higher and 99/1 or lower. In a preferable embodiment, BA/2EHA can be 60/40 or higher (e.g. 60/40 or higher and 99/1 or lower), 80/20 or higher, or even 90/10 or higher (e.g. 90/10 or higher and 99/1 or lower).

The art disclosed herein can be preferably implemented in an embodiment where the monomers forming the acrylic polymer include at least 50% (by weight) $C_{1-6}$ alkyl (meth)acrylate. In other words, it is preferable that the polymerization ratio of the $C_{1-6}$ alkyl (meth)acrylate in the acrylic polymer is 50% by weight or higher. With such use of the $C_{1-6}$ alkyl (meth)acrylate as the primary monomer, the acrylic polymer can be preferably designed to obtain deformation resistance to a continuous z-axial load. The ratio of the $C_{1-6}$ alkyl (meth)acrylate in the monomers (i.e. its polymerization ratio) is more preferably higher than 50% by weight, yet more preferably 60% by weight or higher, or particularly preferably 70% by weight or higher (e.g. 80% by weight or higher, or even 85% by weight or higher). The upper limit of the ratio of $C_{1-6}$ alkyl (meth)acrylate in the monomers is not particularly limited. It is usually 99% by weight or lower; in relation to the ratio of other copolymerizable monomer(s) used, it is suitably 97% by weight or lower, or preferably 95% by weight or lower. For the $C_{1-6}$ alkyl (meth)acrylate, solely one species or a combination of two or more species can be used. As the $C_{1-6}$ alkyl (meth) acrylate, a $C_{1-6}$ alkyl acrylate is preferable, a $C_{2-6}$ alkyl acrylate is more preferable, and a $C_{1-6}$ alkyl acrylate is even more preferable. In another embodiment, the $C_{1-6}$ alkyl (meth)acrylate is preferably a $C_{1-4}$ alkyl acrylate, or more preferably a $C_{2-4}$ alkyl acrylate. A favorable example of the $C_{1-6}$ alkyl (meth)acrylate is BA.

In an embodiment using BA as the primary monomer, the copolymerization ratio of BA in the acrylic polymer is preferably 50% by weight or higher, more preferably higher than 50% by weight, yet more preferably 60% by weight or higher, particularly preferably 70% by weight or higher (e.g. 80% by weight or higher, or even 85% by weight or higher), or more particularly preferably 90% by weight or higher (e.g. higher than 90% by weight). With the BA copolymerized as the primary monomer, the PSA can bond well to adherends. The copolymerization ratio of BA in the acrylic polymer is not particularly limited. It is usually 99% by weight or lower; in relation to the copolymerization ratio of other copolymerizable monomer(s) (e.g. an acidic group-containing monomer), it is suitably 97% by weight or lower, or preferably 95% by weight or lower.

In a preferable embodiment of the art disclosed herein, an acidic group-containing monomer is used as a monomer that is copolymerizable with the alkyl (meth)acrylate which is the primary monomer. The acidic group-containing monomer can enhance cohesion based on its polarity and provide bonding strength relative to polar adherends. When a crosslinking agent such as isocyanate-based and epoxy-based crosslinking agents is used, the acidic group (typically a carboxyl group) serves as a crosslinking point in the acrylic polymer. These functions can favorably bring about deformation resistance to a continuous z-axial load. With the use of the acidic group-containing monomer at or above a prescribed ratio, the acrylic polymer can be preferably designed to bring about light-pressure initial adhesion and deformation resistance to a continuous z-axial load.

As the acidic group-containing monomer, a carboxy group-containing monomer is preferably used. Examples of the carboxy group-containing monomer include ethylenic unsaturated monocarboxylic acids such as acrylic acid (AA), methacrylic acid (MAA), carboxyethyl (meth)acrylate, crotonic acid, and isocrotonic acid; and ethylenic unsaturated dicarboxylic acids such as maleic acid, itaconic acid and citraconic acid as well as their anhydrides (maleic acid anhydride, itaconic acid anhydride, etc.). The acidic group-containing monomer can be a monomer having a metal carboxylate (e.g. an alkali metal salt). In particular, AA and MAA are preferable, with AA being more preferable. When one, two or more species of acidic group-containing monomers are used, the ratio of AA in the acidic group-containing monomer is preferably 50% by weight or higher, more preferably 70% by weight or higher, or yet more preferably 90% by weight or higher. In a particularly preferable embodiment, the acidic group-containing monomer essentially consists of AA. For its multiple functions including its polarity based on its carboxy group and its function to provide crosslinking points as well as its Tg (106° C.), in the acidic group-containing monomer disclosed herein, AA is thought to be the most suitable monomer in view of balancing light-pressure initial adhesion and deformation resistance to a continuous z-axial load.

In the art disclosed herein, the acidic group-containing monomer content (typically the carboxy group-containing monomer content) in the monomers (i.e. the copolymerization ratio of the acidic group-containing monomer in the acrylic polymer) is usually 3% by weight or higher, or suitably 5% by weight or higher. With the use of at least the prescribed amount of the acidic group-containing monomer, based on its cohesion-enhancing effect, etc., it is possible to preferably obtain an acrylic polymer that can provide both light-pressure initial adhesion and deformation resistance to a continuous z-axial load. The copolymerization ratio of the acidic group-containing monomer in the acrylic polymer can be, for instance, 8% by weight or higher, 10% by weight or higher, higher than 10% by weight, 11% by weight or higher, or even 12% by weight or higher. In case of obtaining light-pressure initial adhesion by press-bonding at a temperature above room temperature, etc., the copolymerization ratio of acidic group-containing monomer in the acrylic polymer can be further increased. In this case, the copolymerization ratio can be 13% by weight or higher, for instance, 15% by weight or higher. The copolymerization ratio of the acidic group-containing monomer in the acrylic polymer is usually suitably 20% by weight or lower; from the standpoint of maintaining the properties of the primary monomer, it is preferably 18% by weight or lower. The copolymerization ratio can be 15% by weight or lower, for instance, 13% by weight or lower. In a more preferable embodiment, the copolymerization ratio of the acidic group-containing monomer in the acrylic polymer is about 12% by weight or lower, more preferably about 10% by weight or lower, or particularly preferably about 8% by weight or lower. In an acrylic polymer having a monomer composition including a large amount of $C_{1-6}$ alkyl (meth)acrylate (typically BA), it is particularly effective that the monomers include the acidic group-containing monomer (e.g. AA) in an amount in these ranges.

In the monomers forming the acrylic polymer disclosed herein, the ratio of acidic group-containing monomer content $C_A$ to primary monomer (typically an alkyl (meth) acrylate) content $C_M$, $C_A/C_M$ (%) (determined by $C_A/C_M \times 100$), is usually 3% or higher, suitably 5% or higher, or preferably 7% or higher; it can also be, for instance, 8% or higher by weight. With the use of at least the prescribed amount of the acidic group-containing monomer relative to the primary monomer (typically an alkyl (meth)acrylate), based on the adhesive properties of the primary monomer and the effect of the acidic group-containing monomer to enhance cohesion, etc., it is possible to preferably obtain an acrylic polymer that can preferably achieve both light-pressure initial adhesion and deformation resistance to a continuous z-axial load. The $C_A/C_M$ ratio can be, for instance, 10% or higher, 11% or higher, or even 12% or higher. In case of obtaining light-pressure initial adhesion by press-bonding at a temperature above room temperature, etc., the copolymerization ratio of acidic group-containing monomer in the acrylic polymer can be further increased. In this case, the $C_A/C_M$ ratio can be 15% or higher, for instance, 18% or higher. The $C_A/C_M$ ratio is usually suitably 25% or lower; from the standpoint of keeping the properties of the primary monomer, it is preferably 20% or lower. The $C_A/C_M$ ratio can be 15% or lower, for instance, 13% or lower. In a more preferable embodiment, the $C_A/C_M$ ratio is about 11% or lower, or more preferably about 9% or lower. In an acrylic polymer having a monomer composition including a large amount of $C_{1-6}$ alkyl (meth)acrylate (typically BA), it is particularly effective that the monomers include the acidic group-containing monomer (e.g. AA) in an amount in these ranges.

In the art disclosed herein, as the secondary monomer copolymerizable with the alkyl (meth)acrylate that is the primary monomer, a copolymerizable monomer can be used excluding carboxy group-containing monomers. As the secondary monomer, for instance, functional group-containing monomers such as those shown below can be used.

Hydroxy group-containing monomers: e.g. hydroxyalkyl (meth)acrylates such as 2-hydroxyethyl (meth)acrylate, 2-hydroxypropyl (meth)acrylate, 3-hydroxypropyl (meth) acrylate, and 4-hydroxybutyl (meth)acrylate; unsaturated alcohols such as vinyl alcohol and allyl alcohol; and poly (propylene glycol mono(meth)acrylate).

Amide group-containing monomers: for example, (meth) acrylamide, N,N-dimethyl(meth)acrylamide, N-butyl(meth) acrylamide, N-methylol(meth)acrylamide, N-methylolpropane(meth)acrylamide, N-methoxymethyl(meth) acrylamide, N-butoxymethyl(meth)acrylamide.

Amino group-containing monomers: e.g. aminoethyl (meth)acrylate, N,N-dimethylaminoethyl (meth)acrylate and t-butylaminoethyl (meth)acrylate.

Epoxy group-containing monomers: e.g. glycidyl (meth) acrylate, methylglycidyl (meth)acrylate, and allyl glycidyl ether.

Cyano group-containing monomers: e.g. acrylonitrile, methacrylonitrile.

Keto group-containing monomers: e.g. diacetone (meth) acrylamide, diacetone (meth)acrylate, vinyl methyl ketone, vinyl ethyl ketone, allyl acetoacetate, vinyl acetoacetate.

Monomers having nitrogen atom-containing rings: e.g. N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloyl morpholine.

Alkoxysilyl group-containing monomers: e.g. (3-(meth) acryloxypropyl)trimethoxysilane, (3-(meth)acryloxypropyl) triethoxysilane, (3-(meth)acryloxypropyl)methyldimethoxysilane, (3-(meth)acryloxypropyl)methyldiethoxysilane.

For the functional group-containing monomer, solely one species or a combination of two or more species can be used. When the monomers forming the acrylic polymer include a functional group-containing monomer, the ratio of the functional group-containing monomer in the monomers is suitably selected in accordance with the light-pressure initial adhesion, deformation resistance to a continuous z-axial load and other required properties. The ratio (copolymerization ratio) of the functional group-containing monomer (e.g. a hydroxy group-containing monomer) is suitably about at least 0.01% by weight (e.g. at least 0.02% by weight, usually at least 0.03% by weight) of the monomers; it can be even at least 0.1% by weight (e.g. at least 0.5% by weight, usually at least 1% by weight). Its upper limit is preferably about 40% by weight or lower (e.g. 30% by weight or lower, usually 20% by weight or lower). In a more preferable embodiment, the ratio of the functional group-containing monomer excluding the acidic group-containing monomer can be, for instance, 10% by weight or lower, or yet suitably 5% by weight or lower; it can be 1% by weight or lower. In a more preferable embodiment, the ratio of the functional group-containing monomer (e.g. a hydroxy group-containing monomer) excluding the acidic group-containing monomer is about 0.5% by weight or lower (e.g. about 0.2% by weight or lower). The monomers forming the acrylic polymer can be essentially free of a functional group-containing monomer besides the acidic group-containing monomer.

As for a monomer forming the acrylic polymer, to increase the cohesion of the acrylic polymer, etc., other comonomer(s) can be used besides the aforementioned acidic group-containing monomers. Examples of such comonomers include vinyl ester-based monomers such as vinyl acetate, vinyl propionate and vinyl laurate; aromatic vinyl compounds such as styrene, substituted styrenes (α-methylstyrene, etc.), and vinyl toluene; cycloalkyl (meth) acrylates such as cyclohexyl (meth)acrylate, cyclopentyl (meth)acrylate, and isobornyl (meth)acrylate; aromatic ring-containing (meth)acrylates such as aryl (meth)acrylate (e.g. phenyl (meth)acrylate), aryloxyalkyl (meth)acrylate (e.g. phenoxyethyl (meth)acrylate), and arylalkyl (meth)acrylate (e.g. benzyl (meth)acrylate); olefinic monomers such as ethylene, propylene, isoprene, butadiene, and isobutylene; chlorine-containing monomers such as vinyl chloride and vinylidene chloride; isocyanate group-containing monomers such as 2-(meth)acryloyloxyethyl isocyanate; alkoxy group-containing monomers such as methoxyethyl (meth)acrylate, and ethoxyethyl (meth)acrylate; and vinyl ether-based monomers such as methyl vinyl ether and ethyl vinyl ether.

The amount of the other comonomer(s) can be suitably selected in accordance with the purpose and application and is not particularly limited. It is usually preferably 10% by weight or less of the monomers. For instance, when a vinyl ester-based monomer (e.g. vinyl acetate) is used as the other comonomer(s), its amount can be, for instance, about 0.1% by weight or more (usually about 0.5% by weight or more) of the monomers, or suitably about 20% by weight or less (usually about 10% by weight or less).

The acrylic polymer may comprise a polyfunctional monomer having at least two polymerizable functional groups (typically radically-polymerizable functional groups), each having an unsaturated double bond such as a (meth)acryloyl group and a vinyl group. The use of the polyfunctional monomer as a monomer can enhance the cohesion of the PSA layer. The polyfunctional monomer can be used as a crosslinking agent.

Examples of the polyfunctional monomer include an ester of a polyol and a (meth)acrylic acid such as ethylene glycol di(meth)acrylate, propylene glycol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, 1,2-ethyleneglycol di(meth)acrylate, 1,4-butanediol di(meth)acrylate, 1,6-hexanediol di(meth)acrylate, 1,12-dodecanediol di(meth) acrylate, trimethylolpropane tri(meth)acrylate, tetramethylolmethane tri(meth)acrylate, etc.; allyl (meth) acrylate, vinyl (meth)acrylate, divinylbenzene, epoxy acrylate, polyester acrylate, urethane acrylate, and the like. Among them, preferable examples are trimethylolpropane tri(meth)acrylate, 1,6-hexanediol di(meth)acrylate, and dipentaerythritol hexa(meth)acrylate. A particularly preferable examples is 1,6-hexanediol di(meth)acrylate. The polyfunctional monomers can be used solely as one species or in combination of two or more species. From the standpoint of the reactivity, etc., it is usually preferable to use a polyfunctional monomer having two or more acryloyl groups.

The amount of the polyfunctional monomer used is not particularly limited. It can be set to suitably achieve the purpose of use of the polyfunctional monomer. From the standpoint of combining a preferable storage modulus disclosed herein and other adhesive performance or other properties in a good balance, the polyfunctional monomer is used in an amount of preferably about 3% by weight or less, more preferably 2% by weight or less, or even more preferably about 1% by weight or less (e.g. about 0.5% by weight or less) of the monomers. When using a polyfunctional monomer, its lower limit of use should just be greater than 0% by weight and is not particularly limited. In usual, when the polyfunctional monomer used accounts for about 0.001% by weight or greater (e.g. about 0.01% by weight or greater) of the monomers, the effect of the use of the polyfunctional monomer can be suitably obtained.

It is suitable to design the composition of monomers forming the acrylic polymer so that the acrylic polymer has a glass transition temperature (Tg) of about −15° C. or lower (e.g. about −70° C. or higher and −15° C. or lower). Here, the acrylic polymer's Tg refers to the value determined by the Fox equation based on the composition of the monomers. As shown below, the Fox equation is a relational expression between the Tg of a copolymer and glass transition temperatures Tgi of homopolymers of the respective monomers constituting the copolymer.

$$1/Tg = \Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As the glass transition temperatures of homopolymers used for determining the Tg value, values found in publicly known documents are used. For example, with respect to the monomers listed below, as the glass transition temperatures of homopolymers of the monomers, the following values are used:

| | |
|---|---|
| 2-ethylhexyl acrylate | −70° C. |
| n-butyl acrylate | −55° C. |
| ethyl acrylate | −22° C. |
| methyl acrylate | 8° C. |
| methyl methacrylate | 105° C. |
| 2-hydroxyethyl acrylate | −15° C. |
| 4-hydroxybutyl acrylate | −40° C. |
| vinyl acetate | 32° C. |
| styrene | 100° C. |
| acrylic acid | 106° C. |
| methacrylic acid | 228° C. |

With respect to the glass transition temperatures of homopolymers of monomers other than those listed above, values given in "Polymer Handbook" (3rd edition, John Wiley & Sons, Inc., Year 1989) are used. When the literature provides two or more values for a certain monomer, the highest value is used.

With respect to monomers for which no glass transition temperatures of the corresponding homopolymers are given in the reference book, values obtained by the following measurement method are used.

In particular, to a reaction vessel equipped with a thermometer, a stirrer, a nitrogen inlet and a condenser, are added 100 parts by weight of monomer(s), 0.2 part by weight of 2,2'-azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature and a homopolymer solution having 33% by weight solid content is obtained. Subsequently, this homopolymer solution is applied onto a release liner by flow coating and allowed to dry to prepare a test sample (a homopolymer sheet) of about 2 mm thickness. This test sample is cut out into a disc of 7.9 mm diameter and is placed between parallel plates; and while applying a shear strain at a frequency of 1

Hz using a rheometer (available from TA Instruments Japan, Inc.; model name ARES), the viscoelasticity is measured in the shear mode over a temperature range of −70° C. to 150° C. at a heating rate of 5° C./min; and the temperature corresponding to the peak top temperature of the tan δ curve is taken as the Tg of the homopolymer.

While no particular limitations are imposed, from the standpoint of the adhesion, the acrylic polymer's Tg is advantageously about −25° C. or lower, preferably about −35° C. or lower, more preferably about −40° C. or lower, or yet more preferably −45° C. or lower; it can also be, for instance, −50° C. or lower, or even −55° C. or lower. From the standpoint of the cohesive strength of the PSA layer, the acrylic polymer's Tg is usually about −75° C. or higher, or preferably about −70° C. or higher. The art disclosed herein can be preferably implemented in an embodiment where the acrylic polymer's Tg is about −65° C. or higher and about −40° C. or lower (e.g. about −65° C. or higher and about −45° C. or lower). In a preferable embodiment, the acrylic polymer's Tg can be about −55° C. or higher and about −45° C. or lower. In another embodiment, the acrylic polymer's Tg can be about −65° C. or higher and about −55° C. or lower. The acrylic polymer's Tg can be adjusted by suitably changing the monomer composition (i.e. the monomer species used in synthesizing the polymer and their ratio).

The Mw of the acrylic polymer is not particularly limited. It can be, for instance, $10 \times 10^4$ or higher and $500 \times 10^4$ or lower. From the standpoint of the cohesion, the Mw is usually about $30 \times 10^4$ or higher, or suitably about $45 \times 10^4$ or higher (e.g. about $65 \times 10^4$ or higher). In a preferable embodiment, the acrylic polymer's Mw is $70 \times 10^4$ or higher. In a typical embodiment of the art disclosed herein, the acrylic polymer's Mw is suitably higher than $70 \times 10^4$. With the use of an acrylic polymer with Mw above $70 \times 10^4$, based on its cohesiveness, excellent deformation resistance to a continuous deformation load can be obtained. The acrylic polymer's Mw is more preferably about $75 \times 10^4$ or higher, yet more preferably about $90 \times 10^4$ or higher, or particularly preferably about $95 \times 10^4$ or higher. In a more particularly preferable embodiment, the Mw is about $100 \times 10^4$ or higher (e.g. about $110 \times 10^4$ or higher) and is typically $120 \times 10^4$ or higher (e.g. $130 \times 10^4$ or higher). The Mw is usually suitably $300 \times 10^4$ or lower (more preferably about $200 \times 10^4$ or lower, e.g. about $150 \times 10^4$ or lower). The Mw of the acrylic polymer can also be about $140 \times 10^4$ or lower. For instance, with respect to an acrylic polymer obtainable by solution polymerization or emulsion polymerization, its Mw is preferably in these ranges.

The dispersity (Mw/Mn) of the acrylic polymer disclosed herein is not particularly limited. The dispersity (Mw/Mn) here refers to the ratio of the weight average molecular weight (Mw) to the number average molecular weight (Mn). In a preferable embodiment, the acrylic polymer's dispersity (Mw/Mn) is below 15. For instance, with respect to an acrylic polymer with a relatively high molecular weight (typically Mw>$70 \times 10^4$) that can be obtained by solution polymerization or emulsion polymerization, its Mw/Mn is preferably in this range. That the acrylic polymer has a Mw/Mn value lower than 15 means that when the polymer has a relatively high molecular weight, it includes a considerable amount of relatively uniform polymer and the polymers accurately manifest cohesion, showing excellent resistance to a continuous deformation load (deformation resistance). The Mw/Mn is preferably lower than 12, more preferably lower than 10, or yet more preferably lower than 8 (e.g. 7.5 or lower). The Mw/Mn is theoretically at least 1; it can also be, for instance, 2 or higher, 3 or higher, or even 4 or higher (typically 5 or higher).

In another embodiment, the acrylic polymer's dispersity (Mw/Mn) is 8 or higher and 40 or lower. For instance, with respect to an acrylic polymer obtainable by solution polymerization or emulsion polymerization, its Mw/Mn is preferably in this range. That the acrylic polymer has a Mw/Mn value of 8 or higher and 40 or lower may indicate a broad molecular weight distribution and considerable amounts of low-molecular-weight polymer and high-molecular-weight polymer. The low-molecular-weight polymer contributes to manifestation of light-pressure initial adhesion for its good wetting properties to adherends. The high-molecular-weight polymer exhibits resistance (deformation resistance) to a continuous deformation load for its cohesiveness. A Mw/Mn value of 8 or higher leads to preferable manifestation of initial adhesion. When the Mw/Mn is 40 or lower, the molecular weight distribution is preferably limited to a suitable range to obtain stable properties (light-pressure initial adhesion and deformation resistance). The Mw/Mn can be 10 or higher, 12 or higher, or even 15 or higher. The Mw/Mn can also be 18 or higher (e.g. 20 or higher). The Mw/Mn is preferably 35 or lower, more preferably 30 or lower, or yet more preferably 25 or lower.

The Mw, Mn and Mw/Mn can be adjusted through polymerization conditions (time, temperature, etc.), the use of chain transfer agent, the choice of a polymerization solvent based on the chain-transfer constant, etc. The Mw and Mn are determined from values based on standard polystyrene obtained by GPC (gel permeation chromatography). As the GPC system, for instance, model name HLC-8320 GPC (column: TSKgel GMH-H(S) available from Tosoh Corporation) can be used.

<PSA Composition>

The PSA layer disclosed herein can be formed with a PSA composition that comprises monomers in a composition as described above as a polymerized product, in a non-polymerized form (i.e. in a form where the polymerizable functional groups are still unreacted), or as a mixture of these. The PSA composition may be in various forms such as a solvent-based PSA composition which comprises PSA (adhesive components) in an organic solvent; an aqueous PSA composition which comprises PSA dispersed in an aqueous solvent; an active energy ray-curable PSA composition prepared so as to form PSA when cured with active energy rays such as UV rays, radioactive rays, etc.; and a hot melt-type PSA composition which is heated to melting for application and allowed to cool to around room temperature to form PSA. From the standpoint of the adhesive properties, etc., the art disclosed herein can be implemented particularly preferably in an embodiment comprising a PSA layer formed from a solvent-based PSA composition or an active energy ray-curable PSA composition.

Herein, the term "active energy ray" in this description refers to an energy ray having energy capable of causing a chemical reaction such as polymerization, crosslinking, initiator decomposition, etc. Examples of the active energy ray herein include lights such as ultraviolet (UV) rays, visible lights, infrared lights, radioactive rays such as α rays, β rays, γ rays, electron beam, neutron radiation, and X rays.

The PSA composition typically comprises at least some of the monomers (possibly a certain species among the monomers or a fraction of its quantity) as a polymer. The polymerization method for forming the polymer is not particularly limited. Heretofore known various polymerization methods can be suitably used. For instance, thermal polymerization (typically carried out in the presence of a thermal polymerization initiator) such as solution polymerization, emulsion polymerization, bulk polymerization, etc.; photopolymerization carried out by irradiating light such as UV light, etc. (typically in the presence of a photopolymerization initiator); active energy ray polymerization carried out by irradiating radioactive rays such as β rays, γ rays, etc.; and the like. In particular, solution polymerization and photopolymerization is preferable. In these polymerization methods, the embodiment of polymerization is not particularly limited. It can be carried out with a suitable selection of a heretofore known monomer supply method, polymerization conditions (temperature, time, pressure, inadiance of light, inadiance of radioactive rays, etc.), materials (polymerization initiator, surfactant, etc.) used besides the monomers, etc.

For instance, in a preferable embodiment, the acrylic polymer can be synthesized by solution polymerization. The solution polymerization gives a polymerization reaction mixture in a form where an acrylic polymer is dissolved in an organic solvent. The PSA layer in the art disclosed herein may be formed from a PSA composition comprising the polymerization reaction mixture or an acrylic polymer solution obtained by subjecting the reaction mixture to a suitable work-up. For the acrylic polymer solution, the polymerization reaction mixture can be used after adjusted to suitable viscosity (concentration) as necessary. Alternatively, an acrylic polymer can be synthesized by a polymerization method (e.g. emulsion polymerization, photopolymerization, bulk polymerization, etc.) other than solution polymerization and an acrylic polymer solution prepared by dissolving the acrylic polymer in an organic solvent can be used as well.

As the method for supplying monomers in solution polymerization, all-at-once supply by which all starting monomers are supplied at once, continuous supply (addition), portion-wise supply (addition) and like method can be suitably employed. The polymerization temperature can be suitably selected in accordance with the species of monomers and the solvent used, the type of polymerization initiator and the like. It can be, for instance, about 20° C. to 170° C. (usually about 40° C. to 140° C.). In a preferable embodiment, the polymerization temperature can be about 75° C. or lower (more preferably about 65° C. or lower, e.g. about 45° C. to about 65° C.).

The solvent used for solution polymerization (polymerization solvent) can be suitably selected among heretofore known organic solvents. For instance, one species of solvent or a mixture of two or more species of solvents can be used, selected among aromatic compounds (e.g. aromatic hydrocarbons) such as toluene and xylene; acetic acid esters such as ethyl acetate and butyl acetate; aliphatic or alicyclic hydrocarbons such as hexane, cyclohexane and methyl cyclohexane; halogenated alkanes such as 1,2-dichloroethane; lower alcohols (e.g. monovalent alcohols with 1 to 4 carbon atoms) such as isopropyl alcohol; ethers such as tert-butyl methyl ether; and ketones such as methyl ethyl ketone and acetone.

On the other hand, in another embodiment of the art disclosed herein, when an active energy ray-curable PSA composition (typically a photocuring PSA composition) is used, as the active energy ray-curable PSA composition, one essentially free of an organic solvent is preferable from the standpoint of the environmental health, etc. For instance, a PSA composition having about 5% by weight or less (more preferably about 3% by weight or less, e.g. about 0.5% by weight or less) organic solvent content is preferable. A PSA composition essentially free of a solvent (meaning to include an organic solvent and an aqueous solvent) is preferable because it is suitable for forming a PSA layer in an embodiment where a wet layer of the PSA composition is cured between a pair of release films as described later. For instance, a preferable PSA composition has a solvent content of about 5% by weight or less (more preferably about 3% by weight or less, e.g. about 0.5% by weight or less). The solvent herein refers to a volatile component that should be eliminated in the process of forming the PSA layer, that is, a volatile component that is not to be a component of the final PSA layer formed.

For the polymerization, depending on the polymerization method and embodiment of polymerization, etc., known or commonly-used thermal polymerization initiator or photopolymerization initiator can be used. These polymerization initiators can be used singly as one species or in a suitable combination of two or more species.

The thermal polymerization initiator is not particularly limited. For example, azo-based polymerization initiator, peroxide-based polymerization initiator, a redox-based polymerization initiator by combination of a peroxide and a reducing agent, substituted ethane-based polymerization initiator and the like can be used. More specific examples include, but not limited to, azo-based initiators such as 2,2'-azobisisobutyronitrile (AIBN), 2,2'-azobis(2-methylpropionamidine) disulfate, 2,2'-azobis(2-amidinopropane) dihydrochloride, 2,2'-azobis[2-(5-methyl-2-imidazolin-2-yl) propane] dihydrochloride, 2,2'-azobis(N,N'-dimethyleneisobutylamidine), and 2,2'-azobis[N-(2-carboxyethyl)-2-methylpropionamidine] hydrate; persulfates such as potassium persulfate and ammonium persulfate; peroxide-based initiators such as benzoyl peroxide (BPO), t-butyl hydroperoxide, and hydrogen peroxide; substituted ethane-based initiators such as phenyl-substituted ethane; redox-based initiators such as combination of a persulfate salt and sodium hydrogen sulfite, and combination of a peroxide and sodium ascorbate. Thermal polymerization can be preferably carried out at a temperature of, for instance, about 20° C. to 100° C. (typically 40° C. to 80° C.).

The photopolymerization initiator is not particularly limited. For instance, the following species can be used: ketal-based photopolymerization initiators, acetophenone-based photopolymerization initiators, benzoin ether-based photopolymerization initiators, acylphosphine oxide-based photopolymerization initiators, α-ketol-based photopolymerization initiators, aromatic sulfonyl chloride-based photopolymerization initiators, photoactive oxime-based photopolymerization initiators, benzoin-based photopolymerization initiators, benzil-based photopolymerization initiators, benzophenone-based photopolymerization initiators, and thioxanthone-based photopolymerization initiators.

Specific examples of ketal-based photopolymerization initiators include 2,2-dimethoxy-1,2-diphenylethane-1-one (e.g. trade name "IRGACURE 651" available from BASF Corporation).

Specific examples of acetophenone-based photopolymerization initiators include 1-hydroxycyclohexyl phenyl ketone (e.g. trade name "IRGACURE 184" available from BASF Corporation), 4-phenoxydichloroacetophenone, 4-t-butyl-dichloroacetophenone, 1-[4-(2-hydroxyethoxy)-phenyl]-2-hydroxy-2-methyl-1-propane-1-one (e.g. trade name "IRGACURE 2959" available from BASF Corporation), and 2-hydroxy-2-methyl-1-phenyl-propane-1-one (e.g. trade name "DAROCUR 1173" available from BASF Corporation), methoxyacetophenone.

Specific examples of benzoin ether-based photopolymerization initiators include benzoin ethers such as benzoin methyl ether, benzoin ethyl ether, benzoin propyl ether, benzoin isopropyl ether, benzoin isobutyl ether, etc., as well as substituted benzoin ethers such as anisole methyl ether.

Specific examples of acylphosphine oxide-based photopolymerization initiators include bis(2,4,6-trimethylbenzoyl)phenylphosphine oxide (e.g. trade name "IRGACURE 819" available from BASF Corporation), bis(2,4,6-trimethylbenzoyl)-2,4-di-n-butoxyphenylphosphine oxide, 2,4,6-trimethylbenzoyldiphenylphosphine oxide (e.g. trade name "LUCIRIN TPO" available from BASF Corporation), and bis(2,6-dimethoxybenzoyl)-2,4,4-trimethylpentylphosphine oxide.

Specific examples of α-ketol-based photopolymerization initiators include 2-methyl-2-hydroxypropiophenone, and 1-[4-(2-hydroxyethyl)phenyl]-2-methylpropane-1-one. Specific examples of aromatic sulfonyl chloride-based photopolymerization initiators include 2-naphthalenesulfonyl chloride. Specific examples of photoactive oxime-based photopolymerization initiators include 1-phenyl-1,1-propanedione-2-(o-ethoxycarbonyl)-oxime. Specific examples of benzoin-based photopolymerization initiators include benzoin. Specific examples of benzil-based photopolymerization initiators include benzil.

Specific examples of benzophenone-based photopolymerization initiators include benzophenone, benzoylbenzoic acid, 3,3'-dimethyl-4-methoxybenzophenone, polyvinylbenzophenone, and α-hydroxycyclohexylphenylketone.

Specific examples of thioxanthone-based photopolymerization initiators include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, and dodecylthioxanthone.

Such thermal polymerization initiator or photopolymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g. about 0.01 part to 1 part by weight) of polymerization initiator can be used.

(PSA Composition Comprising Monomers in a Fully-Polymerized Form)

The PSA composition according to a preferable embodiment comprises the monomers as a fully-polymerized product. Such a PSA composition may be in a form of, for instance, a solvent-based composition comprising in an organic solvent an acrylic polymer which is the fully-polymerized product of the monomers, a water-dispersed PSA composition such that the acrylic polymer is dispersed in an aqueous solvent. As used herein, the term "fully-polymerized product" refers to a product whose monomer conversion is above 95% by weight.

(PSA Composition Comprising Polymerized and Unpolymerized (Unreacted) Monomers)

The PSA composition according to another preferable embodiment comprises a polymerization product (or polymerization reactants mixture) of a monomer mixture comprising at least some of the monomers (starting monomers) that constitute the composition. Typically, of the monomers, some are included as a polymerized product and the rest are included as unreacted monomers. The polymerization product of the monomer mixture can be prepared by polymerizing the monomer mixture at least partially.

The polymerization product is preferably a partially-polymerized product of the monomer mixture. Such a partially-polymerized product is a mixture of a polymer formed from the monomer mixture and unreacted monomers, and it is typically in a form of syrup (viscous liquid). Hereinafter, a partially-polymerized product having such a form may be referred to as "monomer syrup" or simply "syrup."

The polymerization method for obtaining the polymerization product from the monomers is not particularly limited. A suitable method can be selected and employed among various polymerization methods as those described earlier. From the standpoint of the efficiency and convenience, a photopolymerization method can be preferably employed. According to a photopolymerization, depending on the polymerization conditions such as irradiation light quantity, etc., the polymer conversion of the monomer mixture can be easily controlled.

With respect to the partially-polymerized product, the monomer conversion of the monomer mixture is not particularly limited. The monomer conversion can be, for instance, about 70% by weight or lower, or preferably about 60% by weight or lower. From the standpoint of facile preparation of the PSA composition comprising the partially-polymerized product and ease of application, etc., the monomer conversion is usually suitably about 50% by weight or lower, or preferably about 40% by weight or lower (e.g. about 35% by weight or lower). The lower limit of monomer conversion is not particularly limited. It is typically about 1% by weight or higher, or usually suitably about 5% by weight or higher.

The PSA composition comprising a partially-polymerized product of the monomer mixture can be easily obtained, for instance, by partially polymerizing a monomer mixture comprising all the starting monomers in accordance with a suitable polymerization method (e.g. photopolymerization). To the PSA composition comprising the partially-polymerized product, other components (e.g. photopolymerization initiator, polyfunctional monomer(s), crosslinking agent, (meth)acrylic oligomer described later, etc.) may be added as necessary. Methods for adding such other components are not particularly limited. For instance, they can be added to the monomer mixture in advance or added to the partially-polymerized product.

The PSA composition disclosed herein may also be in a form where a fully-polymerized product of a monomer mixture comprising certain species (starting monomers) among the monomers is dissolved in the rest of the monomers (unreacted) or a partially-polymerized product thereof. A PSA composition in such a form is also included in examples of the PSA composition comprising polymerized and non-polymerized (unreacted) monomers.

When forming PSA from a PSA composition comprising polymerized and non-polymerized monomers, a photopolymerization method can be preferably employed as the curing method (polymerization method). With respect to a PSA composition comprising a polymerization product prepared by a photopolymerization method, it is particularly preferable to employ photopolymerization as the curing method. A polymerization product obtained by photopolymerization already contains a photopolymerization initiator. When the PSA composition comprising the polymerization product is cured to form PSA, the photo-curing can be carried out without any additional photopolymerization initiator. Alternatively, the PSA composition may be obtained by adding a photopolymerization initiator as necessary to the polymerization product prepared by photopolymerization. The additional photopolymerization initiator may be the same as or different from the photopolymerization initiator used in preparing the polymerization product. If the PSA composition is prepared by a method other than photopolymerization, a photopolymerization initiator can be added to make it light-curable. The light-curable PSA composition is advantageous as it can readily form even a thick PSA layer. In a preferable embodiment, the PSA composition can be photopolymerized by UV irradiation to form a PSA. The UV irradiation may be performed using a commonly-known high-pressure mercury lamp, low-pressure mercury lamp, metal halide lamp, or the like.

(Crosslinking Agent)

The PSA composition (preferably a solvent-based PSA composition) used for forming the PSA layer preferably includes a crosslinking agent as an optional component. With the crosslinking agent content, the viscoelastic properties disclosed herein can be preferably obtained. The PSA layer in the art disclosed herein may include the crosslinking agent in a post-crosslinking-reaction form, a pre-crosslinking-reaction form, a partially crosslinked form, an intermediate or composite form of these, and so on. The PSA layer usually includes the crosslinking agent mostly in the post-crosslinking-reaction form.

The type of crosslinking agent is not particularly limited. A suitable species can be selected and used among heretofore known crosslinking agents. Examples of such crosslinking agents include isocyanate-based crosslinking agents, epoxy-based crosslinking agents, oxazoline-based crosslinking agents, aziridine-based crosslinking agents, melamine-based crosslinking agents, carbodiimide-based crosslinking agents, hydrazine-based crosslinking agents, amine-based crosslinking agents, peroxide-based crosslinking agents, metal chelate-based crosslinking agents, metal alkoxide-based crosslinking agents, and metal salt-based crosslinking agents. For the crosslinking agent, solely one species or a combination of two or more species can be used. Examples of crosslinking agents that can be preferably used in the art disclosed herein include isocyanate-based crosslinking agents, epoxy-based crosslinking agents and oxazoline-based crosslinking agents.

As the epoxy-based crosslinking agent, a compound having at least two epoxy groups per molecule can be used without particular limitations. A preferable epoxy-based crosslinking agent has three to five epoxy groups per molecule. For the epoxy-based crosslinking agent, solely one species or a combination of two or more species can be used.

Specific examples of the epoxy-based crosslinking agent include, but are not particularly limited to, N,N,N',N'-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Commercial epoxy-based crosslinking agents include trade names TETRAD-C and TETRAD-X available from Mitsubishi Gas Chemical Co., Inc.; trade name EPICLOM CR-5L available from DIC Corporation; trade name DENACOL EX-512 available from Nagase ChemteX Corporation; and trade name TEPIC-G available from Nissan Chemical Industries, Ltd.

In an embodiment using an epoxy-based crosslinking agent, its amount used is not particularly limited. The epoxy-based crosslinking agent can be used in an amount of, for instance, more than 0 part by weight and about 1 part by weight or less (preferably about 0.001 part to 0.5 part by weight) to 100 parts by weight of the acrylic polymer. From the standpoint of favorably obtaining the effect to enhance cohesion, the epoxy-based crosslinking agent is used in an amount of usually suitably about 0.002 part by weight or greater to 100 parts by weight of the acrylic polymer, or preferably about 0.005 part by weight or greater; it can also be, for instance, 0.01 part by weight or greater, about 0.02 part by weight or greater, or even about 0.03 part by weight or greater. From the standpoint of avoiding insufficient light-pressure initial adhesion due to excessive crosslinking, the epoxy-based crosslinking agent is used in an amount of usually suitably about 0.2 part by weight or less to 100 parts by weight of the acrylic polymer, or preferably about 0.1 part by weight or less (e.g. 0.05 part by weight or less).

As the isocyanate-based crosslinking agent, a polyfunctional isocyanate (which refers to a compound having an average of two or more isocyanate groups per molecule, including a compound having an isocyanurate structure) can be preferably used. For the isocyanate-based crosslinking agent, solely one species or a combination of two or more species can be used.

A preferable example of the polyfunctional isocyanate has an average of three or more isocyanate groups per molecule. Such a tri-functional or higher polyfunctional isocyanate can be a multimer (e.g. a dimer or a trimer), a derivative (e.g., an addition product of a polyol and two or more polyfunctional isocyanate molecules), a polymer or the like of a di-functional, tri-functional, or higher polyfunctional isocyanate. Examples include polyfunctional isocyanates such as a dimer and a trimer of a diphenylmethane diisocyanate, an isocyanurate (a cyclic trimer) of a hexamethylene diisocyanate, a reaction product of trimethylol propane and a tolylene diisocyanate, a reaction product of trimethylol propane and a hexamethylene diisocyanate, polymethylene polyphenyl isocyanate, polyether polyisocyanate, and polyester polyisocyanate. Commercial polyfunctional isocyanates include trade name DURANATE TPA-100 available from Asahi Kasei Chemicals Corporation and trade names CORONATE L, CORONATE HL, CORONATE HK, CORONATE HX, and CORONATE 2096 available from Tosoh Corporation.

In an embodiment using an isocyanate-based crosslinking agent, its amount used is not particularly limited. The isocyanate-based crosslinking agent can be used in an amount of, for instance, about 0.5 part by weight or greater and about 10 parts by weight or less to 100 parts by weight of the acrylic polymer. From the standpoint of the cohesion, the isocyanate-based crosslinking agent is used in an amount of usually suitably about 0.1 part by weight or greater, or preferably about 0.3 part by weight or greater (e.g. 0.5 part by weight or greater). In a more preferable embodiment, the amount of the isocyanate-based crosslinking agent used to 100 parts by weight of the acrylic polymer is about 1 part by weight or greater, or possibly about 1.5 parts by weight or greater. The isocyanate-based crosslinking agent is used in an amount of usually suitably about 8 parts by weight or less to 100 parts by weight of the acrylic polymer, or preferably about 5 parts by weight or less (e.g. less than about 4 parts by weight). In a more preferable embodiment, the amount of the isocyanate-based crosslinking agent used to 100 parts by weight of the acrylic polymer is about 3 parts by weight or less, for instance, about 2 parts by weight or less.

As the oxazoline-based crosslinking agent, a species having at least one oxazoline group per molecule can be used without particular limitations. For the oxazoline-based crosslinking agent, solely one species or a combination of two or more species can be used. The oxazoline group can be 2-oxazoline group, 3-oxazoline group, or 4-oxazoline group. It is usually preferable to use an oxazoline-based crosslinking agent having a 2-oxazoline group. For instance, a copolymer obtainable by copolymerization of an oxazoline capable of undergoing addition polymerization and other monomer(s) can be used as the oxazoline-based crosslinking agent. Non-limiting examples of the additionally-polymerizable oxazoline include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline.

Examples of the oxazoline-based crosslinking agent include the crosslinking agents exemplified in Japanese Patent Application Publication No. 2009-001673. Specific examples include a compound that includes a main chain formed of an acrylic or styrene backbone, with the main chain having an oxazoline group-containing side chain. Favorable examples include an oxazoline group-containing acrylic polymer that includes a main chain formed of an acrylic backbone, with the main chain having an oxazoline group-containing side chain. Examples of commercial oxazoline-based crosslinking agents include products of Nippon Shokubai Co., Ltd., under trade names EPOCROS WS-500, EPOCROS WS-700, EPOCROS K-2010E, EPOCROS K-2020E and EPOCROS K-2030E.

In an embodiment using an oxazoline-based crosslinking agent, its amount used is not particularly limited. The amount of the oxazoline-based crosslinking agent used to 100 parts by weight of the acrylic polymer can be, for instance, 0.05 part by weight or greater, 0.1 part by weight or greater, or 0.5 part by weight or greater. In some embodiments, the amount of the oxazoline-based crosslinking agent used to 100 parts by weight of the acrylic polymer can be 1 part by weight or greater, or even 1.5 part by weight or greater. With increasing amount of the oxazoline-based crosslinking agent used, it tends to be easier to obtain greater cohesion. The amount of the oxazoline-based crosslinking agent used to 100 parts by weight of the acrylic polymer can be usually, for instance, 10 parts by weight or less, 8 parts by weight or less, 5 parts by weight or less, or even 3 parts by weight or less.

The art disclosed herein can be preferably implemented in an embodiment using an epoxy-based crosslinking agent as the crosslinking agent. The epoxy group of the epoxy-based crosslinking agent may react with an acidic group possibly introduced in the acrylic polymer to form a crosslinked structure. The crosslinking reaction leads to greater cohesion of the PSA, giving rise to more preferable deformation resistance to a continuous z-axial load. Examples of such an embodiment include an embodiment using solely an epoxy-based crosslinking agent and an embodiment using an epoxy-based crosslinking agent in combination with other crosslinking agent(s). In an embodiment, the PSA composition includes an epoxy-based crosslinking agent as the crosslinking agent, but it is essentially free of an isocyanate-based crosslinking agent.

In another embodiment, the PSA composition includes an isocyanate-based crosslinking agent as the crosslinking agent. The isocyanate group of the isocyanate-based crosslinking agent may react with the acidic group possibly introduced in the acrylic polymer in a reaction mode different from that of the epoxy-based crosslinking agent to form a crosslinked structure. In a PSA sheet having a PSA layer at least on one face of substrate film, from the standpoint of enhancing the anchoring to the substrate film, the use of the isocyanate-based crosslinking agent is meaningful.

In a particularly preferable embodiment, the PSA composition includes both an epoxy-based crosslinking agent and an isocyanate-based crosslinking agent as the crosslinking agent. For instance, the combined use of the epoxy-based crosslinking agent and isocyanate-based crosslinking agent for the acidic group-containing acrylic polymer can further enhance deformation resistance to a continuous z-axial load without impairing the light-pressure initial adhesion. In particular, even when it is placed in a high-repulsion, high-temperature and high-humidity environment as the one studied in the working examples described later, it may retain z-axial deformation resistance for a long time. The isocyanate-based crosslinking agent content $C_I$ to epoxy-based crosslinking agent content $C_E$ ratio ($C_I/C_E$) is not particularly limited and can be suitably selected so as to obtain deformation resistance to a continuous z-axial load. The $C_I/C_E$ ratio is, for instance, higher than 1, suitably about 5 or higher, preferably about 15 or higher, more preferably about 30 or higher, yet more preferably about 60 or higher, or particularly preferably about 80 or higher (e.g. about 100 or higher). The $C_I/C_E$ ratio is, for instance, about 1000 or lower, suitably about 500 or lower, preferably about 200 or lower, more preferably about 150 or lower, or yet more preferably about 120 or lower (e.g. about 80 or lower).

The crosslinking agent content (its total amount) in the PSA composition disclosed herein is not particularly limited. From the standpoint of the cohesion, the crosslinking agent content is usually about 0.001 part by weight or greater to 100 parts by weight of the acrylic polymer, suitably about 0.002 part by weight or greater, preferably about 0.005 part by weight or greater, more preferably about 0.01 part by weight or greater, yet more preferably about 0.02 part by weight or greater, or particularly preferably about 0.03 part by weight or greater. From the standpoint of avoiding insufficient light-pressure initial adhesion, the crosslinking agent content in the PSA composition is usually about 20 parts by weight or less to 100 parts by weigh of the acrylic polymer, suitably about 15 parts by weight or less, or preferably about 10 parts by weight or less (e.g. about 5 parts by weight or less).

(Tackifier Resin)

In a preferable embodiment, the PSA composition (and even the PSA layer) includes a tackifier resin. As the tackifier resin possibly included in the PSA composition, one, two or more species can be selected and used among various known tackifier resins such as phenolic tackifier resins, terpene-based tackifier resins, modified terpene-based tackifier resins, rosin-based tackifier resins, hydrocarbon-based tackifier resins, epoxy-based tackifier resins, polyamide-based tackifier resins, elastomer-based tackifier resins, and ketone-based tackifier resins. The use of tackifier resin enhances adhesive strength including light-pressure initial adhesive strength.

Examples of the phenolic tackifier resin include terpene-phenol resin, hydrogenated terpene-phenol resin, alkylphenol resin and rosin-phenol resin.

The terpene-phenol resin refers to a polymer comprising a terpene residue and a phenol residue, and its concept encompasses copolymer of a terpene and a phenol compound (terpene-phenol copolymer resin) as well as a terpene or its homopolymer or copolymer modified with phenol (phenol-modified terpene resin). Preferable examples of a terpene forming such terpene-phenol resin include monoterpenes such as α-pinene, β-pinene, limonenes (including d limonene, 1 limonene and d/l limonene (dipentene)). The hydrogenated terpene-phenol resin refers to a hydrogenated terpene-phenol resin having a hydrogenated structure of such terpene-phenol resin. It is sometimes called hydrogenated terpene-phenol resin.

The alkylphenol resin is a resin (oil phenol resin) obtainable from an alkylphenol and formaldehyde. Examples of the alkylphenol resin include a novolac type and a resol type.

The rosin-phenol resin is typically a resin obtainable by phenol modification of a rosin or one of the various rosin derivatives listed above (including a rosin ester, an unsaturated fatty acid-modified rosin and an unsaturated fatty acid-modified rosin ester). Examples of the rosin-phenol resin include a rosin-phenol resin obtainable by acid catalyzed addition of a phenol to a rosin or one of the various rosin derivatives listed above followed by thermal polymerization, etc.

Among these phenolic tackifier resins, terpene-phenol resin, hydrogenated terpene-phenol resin and alkyl phenol resin are preferable; terpene-phenol resin and hydrogenated terpene-phenol resin are more preferable; in particular, terpene-phenol resin is preferable.

Examples of terpene-based tackifier resin include terpenes (e.g. monoterpenes) such as α-pinene, β-pinene, d-limonene, l-limonene, and dipentene. It can be homopolymer of one species of terpene or copolymer of two or more species of terpene. Examples of the homopolymer of one species of terpene include α-pinene polymer, β-pinene polymer, and dipentene polymer.

Examples of modified terpene resin include resins obtainable by modification of the terpene resins. Specific examples include styrene-modified terpene resin and hydrogenated terpene resins.

The concept of rosin-based tackifier resin here encompasses both rosins and rosin derivative resins. Examples of rosins include unmodified rosins (raw rosins) such as gum rosin, wood rosin, and tall-oil rosin; and modified rosins obtainable from these unmodified rosins via modifications such as hydrogenation, disproportionation, and polymerization (hydrogenated rosins, disproportionated rosins, polymerized rosins, other chemically-modified rosins, etc.).

The rosin derivative resin is typically a derivative of a rosin as those listed above. The concept of rosin-based resin herein encompasses a derivative of an unmodified rosin and a derivative of a modified rosin (including a hydrogenated rosin, a disproportionated rosin, and a polymerized rosin). Examples of the rosin derivative resin include rosin esters such as an unmodified rosin ester which is an ester of an unmodified rosin and an alcohol, and a modified rosin ester which is an ester of a modified rosin and an alcohol; an unsaturated fatty acid-modified rosin obtainable by modifying a rosin with an unsaturated fatty acid; an unsaturated fatty acid-modified rosin ester obtainable by modifying a rosin ester with an unsaturated fatty acid; rosin alcohols obtainable by reduction of carboxy groups in rosins or aforementioned various rosin derivatives (including rosin esters, unsaturated fatty acid-modified rosin, and an unsaturated fatty acid-modified rosin ester); and metal salts of rosins or aforementioned various rosin derivatives. Specific examples of rosin esters include a methyl ester of an unmodified rosin or a modified rosin (hydrogenated rosin, disproportionated rosin, polymerized rosin, etc.), triethylene glycol ester, glycerin ester, and pentaerythritol ester.

Examples of hydrocarbon-based tackifier resin include various types of hydrocarbon-based resins such as aliphatic hydrocarbon resins, aromatic hydrocarbon resins, alicyclic hydrocarbon resins, aliphatic/aromatic petroleum resins (styrene-olefin-based copolymer, etc.), aliphatic/alicyclic petroleum resins, hydrogenated hydrocarbon resins, coumarone-based resins, and coumarone-indene-based resins.

The softening point of the tackifier resin is not particularly limited. From the standpoint of obtaining greater cohesion, it is preferable to use a tackifier resin having a softening point (softening temperature) of about 80° C. or higher (preferably about 100° C. or higher). For instance, a phenolic tackifier resin (terpene-phenol resin, etc.) having such a softening point can be preferably used. In a preferable embodiment, a terpene-phenol resin having a softening point of about 135° C. or higher (or even about 140° C. or higher) can be used. The maximum softening point of the tackifier resin is not particularly limited. From the standpoint of the tightness of adhesion to adherend and substrate film, it is preferable to use a tackifier resin having a softening point of about 200° C. or lower (more preferably about 180° C. or lower). The softening point of a tackifier resin can be determined based on the softening point test method (ring and ball method) specified in JIS K2207.

In a preferable embodiment, the tackifier resin includes one, two or more species of phenolic tackifier resins (e.g. terpene-phenol resin). The art disclosed herein can be preferably implemented, for instance, in an embodiment where the terpene-phenol resin accounts for about 25% by weight or more (more preferably about 30% by weight or more) of the total amount of the tackifier resin. The terpene-phenol resin may account for about 50% by weight or more of the total amount of the tackifier resin, or about 80% by weight or more (e.g. about 90% by weight or more) thereof. Essentially all (e.g. about 95% by weight or more and 100% by weight or less, or even about 99% by weight or more and 100% by weight or less) of the tackifier resin can be the terpene-phenol resin.

The amount of phenolic tackifier resin (e.g. terpene-phenol resin) included is not particularly limited as long as expected viscoelastic properties are satisfied. From the standpoint of the adhesive strength (e.g. light-pressure initial adhesion), the amount of phenolic tackifier resin (e.g. terpene-phenol resin) included is usually about 1 part by weight or greater, suitably about 5 parts by weight or greater to 100 parts by weight of the acrylic polymer, preferably about 8 parts by weight or greater (typically 10 parts by weight or greater), or more preferably about 12 parts by weight or greater (e.g. 15 parts by weight or greater). From the standpoint of the deformation resistance, etc., the phenolic tackifier resin content is suitably about 45 parts by weight or less to 100 parts by weight of the acrylic polymer, preferably about 35 parts by weight or less, more preferably about 30 parts by weight or less, or yet more preferably less than 30 parts by weight (e.g. 25 parts by weight or less, typically 20 parts by weight or less).

While no particular limitations are imposed, in an embodiment of the art disclosed herein, the tackifier resin may include a tackifier resin having a hydroxyl value above 20 mgKOH/g. In particular, a tackifier resin having a hydroxyl value of 30 mgKOH/g or greater is preferable. Hereinafter, a tackifier resin having a hydroxyl value of 30 mgKOH/g or greater may be referred to as a "high-hydroxyl-value resin." When the tackifier resin includes such a high-hydroxyl-value resin, its interaction with a crosslinking agent such as an isocyanate-based crosslinking agent can bring about a PSA layer having high cohesion in addition to adhesive strength. In an embodiment, the tackifier resin may also include a high-hydroxyl-value resin having a hydroxyl value of 50 mgKOH/g or greater (more preferably 70 mgKOH/g or higher). A high-hydroxyl-value resin (e.g. terpene-phenol resin) may be preferably used, for instance, in combination with an acrylic polymer whose primary monomer is a $C_{1-6}$ alkyl (meth)acrylate to adequately bring about adhesive strength to adherends.

The maximum hydroxyl value of the high-hydroxyl-value resin is not particularly limited. From the standpoint of the compatibility with the acrylic polymer, the hydroxyl value of the high-hydroxyl-value resin is usually about 300 mgKOH/g or less, suitably about 200 mgKOH/g or less, preferably about 180 mgKOH/g or less, more preferably about 160 mgKOH/g or less, or yet more preferably about 140 mgKOH/g or less. The art disclosed herein can be preferably implemented in an embodiment where the tackifier resin include a high-hydroxyl-value resin (e.g. phenolic tackifier resin, preferably terpene-phenol resin) having a hydroxyl value of 30 mgKOH/g to 160 mgKOH/g. In an embodiment, a high-hydroxyl-value resin having a hydroxyl value of 30 mgKOH/g to 80 mgKOH/g (e.g. 30 mgKOH/g to 65 mgKOH/g) can be preferably used. In another embodiment, a high-hydroxyl-value resin having a hydroxyl value of 70 mgKOH/g to 140 mgKOH/g can be preferably used.

As the hydroxyl value, can be used a value measured by the potentiometric titration method specified in JIS K0070: 1992. Details of the method are described below.

[Method for Measuring Hydroxyl Value]

1. Reagents (1) As the acetylation reagent, is used a solution prepared by mixing with sufficient stirring about 12.5 g (approximately 11.8 mL) of anhydrous acetic acid and pyridine added up to a total volume of 50 mL. Alternatively, is used a solution prepared by mixing with sufficient stirring about 25 g (approximately 23.5 mL) of anhydrous acetic acid and pyridine up to a total volume of 100 mL.

(2) As the titrant, is used a 0.5 mol/L potassium hydroxide (KOH) solution in ethanol.

(3) For others, toluene, pyridine, ethanol and distilled water should be ready for use.

2. Procedures (1) Approximately 2 g of analyte is accurately weighed out in a flat-bottom flask, 5 mL of the acetylation reagent and 10 mL of pyridine are added, and an air condenser is placed on.

(2) The flask is heated in a bath at 100° C. for 70 minutes and then cooled. From the top of the condenser, 35 mL of toluene is added as a solvent and stirred. Subsequently, 1 mL of distilled water is added and the resultant is stirred to decompose any remaining anhydrous acetic acid. The flask is heated in the bath again for 10 minutes to complete the decomposition and then cooled.

(3) After rinsed with 5 mL of ethanol, the condenser is removed. Subsequently, 50 mL of pyridine is added as a solvent and the resultant is stirred.

(4) Using a volumetric pipette, is added 25 mL of the 0.5 mol/L KOH solution.

(5) Potentiometric titration is carried out with the 0.5 mol/L KOH ethanol solution. The inflection point in the resulting titration curve is taken as the final point.

(6) For a blank titration, procedures (1) to (5) are carried out without addition of the analyte.

3. Calculations

The hydroxyl value is calculated by the following equation:

$$\text{Hydroxyl value}(\text{mgKOH/g})=[(B-C)\times f\times 28.05]/S+D$$

wherein:

B is the volume (mL) of the 0.5 mol/L KOH ethanol solution used in the blank titration;

C is the volume (mL) of the 0.5 mol/L KOH ethanol solution used to titrate the analyte;

f is the factor of the 0.5 mol/L KOH ethanol solution;

S is the weight of analyte (g);

D is the acid value;

28.05 is one half the molecular weight of KOH.

As the high-hydroxyl-value resin, a species having at least a certain hydroxyl value can be used among the aforementioned various tackifier resins. For the high-hydroxyl-value resin, solely one species or a combination of two or more species can be used. For instance, as the high-hydroxyl-value resin, a phenolic tackifier resin having a hydroxyl value of 30 mgKOH/g or greater can be preferably used. Terpene-phenol resin is convenient for use because its hydroxyl value can be arbitrarily controlled by the copolymerization ratio of phenol.

While no particular limitations are imposed, as the tackifier resin in the art disclosed herein, a tackifier resin having a hydroxyl value less than 30 mgKOH/g (e.g. less than 20 mgKOH/g) can be used. Hereinafter, a tackifier resin having a hydroxyl value less than 30 mgKOH/g may be referred to as a "low-hydroxyl-value resin." The hydroxyl value of the low-hydroxyl-value resin can be about 15 mgKOH/g or less, or even about 10 mgKOH/g or less. The minimum hydroxyl value of the low-hydroxyl-value resin is not particularly limited. It can be essentially 0 mgKOH/g. Such a low-hydroxyl-value resin (e.g. terpene-phenol resin) can be preferably used, for instance, in combination with an acrylic polymer whose primary monomer is a $C_{7-10}$ alkyl (meth)acrylate to adequately provide adhesion to adherend.

While no particular limitations are imposed, when a high-hydroxyl-value resin is used, the ratio of the high-hydroxyl-value resin (e.g. terpene-phenol resin) to the entire tackifier resin in the PSA layer can be, for instance, about 25% by weight or higher, preferably about 30% by weight or higher, or more preferably 50% by weight or higher (e.g. about 80% by weight or higher, typically about 90% by weight or higher). The high-hydroxyl-value resin may account for essentially all (e.g. about 95% to 100% by weight, or even about 99% to 100% by weight) of the tackifier resin.

In an embodiment using a tackifier resin, the tackifier resin content is not particularly limited. The tackifier resin content is usually 1 part by weight or greater to 100 parts by weight of the acrylic polymer, possibly about 5 parts by weight or greater, or suitably about 8 parts by weight or greater (e.g. about 10 parts by weight or greater). The art disclosed herein can be preferably implemented in an embodiment where the tackifier resin content to 100 parts by weight of the acrylic polymer is about 12 parts by weight or greater (e.g. about 15 parts by weight or greater). The maximum tackifier resin content is not particularly limited. From the standpoint of the compatibility with the acrylic polymer and deformation resistance, the tackifier resin content relative to 100 parts by weight of the acrylic polymer is suitably about 70 parts by weight or less, preferably about 55 parts by weight or less, or more preferably about 45 parts by weight or less (e.g. about 40 parts by weight or less, typically about 30 parts by weight or less). In a preferable embodiment, the tackifier resin content to 100 parts by weight of the acrylic polymer is less than 30 parts by weight, more preferably about 25 parts by weight or less, or yet more preferably about 20 parts by weight or less.

((Meth)Acrylic Oligomer)

From the standpoint of increasing the adhesive strength, etc., the PSA composition (and the PSA layer) disclosed herein can comprise a (meth)acrylic oligomer. For the (meth)acrylic oligomer, it is preferable to use a polymer having a higher Tg value than the Tg value of the copolymer corresponding to the composition of monomers (which typically, approximately corresponds to the Tg value of the (meth)acrylic polymer contained in PSA formed from the PSA composition). The inclusion of the (meth)acrylic oligomer can increase the adhesive strength of the PSA.

The (meth)acrylic oligomer has a Tg of about 0° C. to about 300° C., preferably about 20° C. to about 300° C., or more preferably about 40° C. to about 300° C. When the Tg falls within these ranges, the adhesive strength can be preferably increased. In a preferable embodiment, from the standpoint of the PSA's cohesion, the Tg of the (meth)acrylic oligomer is about 30° C. or higher, more preferably about 50° C. or higher (e.g. about 60° C. or higher); from the standpoint of the light-pressure initial adhesion, it is preferably about 200° C. or lower, more preferably about 150° C. or lower, or yet more preferably about 100° C. or lower (e.g. about 80° C. or lower). The Tg value of the (meth)acrylic oligomer is determined by the Fox equation, similarly to the Tg of the copolymer corresponding to the composition of monomers.

The (meth)acrylic oligomer may have a weight average molecular weight (Mw) of typically about 1,000 or larger, but smaller than about 30,000, preferably about 1,500 or larger, but smaller than about 20,000, or more preferably about 2,000 or larger, but smaller than about 10,000. A weight average molecular weight within these ranges is preferable in obtaining good adhesive strength and good holding properties. In a preferable embodiment, from the standpoint of the deformation resistance to a continuous z-axial load, the (meth)acrylic oligomer's Mw is about 2500 or higher (e.g. about 3000 or higher); from the standpoint of the light-pressure initial adhesion, it is preferably about 7000 or lower, more preferably about 5000 or lower (e.g. about 4500 or lower, typically about 400 or lower). The (meth)acrylic oligomer's Mw can be determined by gel permeation chromatography (GPC) as a value based on standard polystyrene. More specifically, it can be determined with HPLC 8020 available from Tosoh Corporation, using two TSKgel GMH-H (20) columns and tetrahydrofuran as an eluent at a flow rate of about 0.5 ml/min.

Examples of monomers forming the (meth)acrylic oligomer include alkyl (meth)acrylate such as methyl (meth)acrylate, ethyl (meth)acrylate, propyl (meth)acrylate, isopropyl (meth)acrylate, butyl (meth)acrylate, isobutyl (meth)acrylate, sec-butyl (meth)acrylate, tert-butyl (meth)acrylate, pentyl (meth)acrylate, isopentyl (meth)acrylate, hexyl (meth)acrylate, 2-ethylhexyl (meth)acrylate, heptyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, and dodecyl (meth)acrylate; an ester of (meth)acrylic acid and an alicyclic alcohol (alicyclic hydrocarbon group-containing (meth)acrylate), such as cyclohexyl (meth)acrylate, isobornyl (meth)acrylate, and dicyclopentanyl (meth)acrylate; aryl (meth)acrylate such as phenyl (meth)acrylate and benzyl (meth)acrylate; and a (meth)acrylate derived from a terpene compound derivative alcohol. These (meth)acrylates may be used solely as one species or in combination of two or more species.

From the standpoint of further increasing the adhesiveness of the PSA layer, the (meth)acrylic oligomer preferably comprises, as a monomeric unit, an acrylic monomer having a relatively bulky structure, typified by an alkyl (meth)acrylate having a branched alkyl group, such as isobutyl (meth)acrylate, tert-butyl (meth)acrylate, etc.; an ester of a (meth)acrylic acid and an alicyclic alcohol (alicyclic hydrocarbon group-containing (meth)acrylate), such as cyclohexyl (meth)acrylate, isobornyl (meth)acrylate, dicyclopentanyl (meth)acrylate, etc.; or an aryl (meth)acrylate such as phenyl (meth)acrylate, benzyl (meth)acrylate, etc. When UV light is used in synthesizing the (meth)acrylic oligomer or forming the PSA layer, a saturated oligomer is preferable because it is less likely to inhibit polymerization. An alkyl (meth)acrylate having a branched alkyl group or an ester of an alicyclic alcohol (alicyclic hydrocarbon group-containing (meth)acrylate) can be favorably used as a monomer constituting the (meth)acrylic oligomer. The branched acyclic alkyl (meth)acrylate, alicyclic hydrocarbon group-containing (meth)acrylate and aryl (meth)acrylate are all included in the (meth)acrylate monomer in the art disclosed herein. The alicyclic hydrocarbon group can be a saturated or unsaturated alicyclic hydrocarbon group.

The ratio of the (meth)acrylate monomer (e.g. an alicyclic hydrocarbon group-containing (meth)acrylate) to all the monomers forming the (meth)acrylic oligomer is typically higher than 50% by weight, preferably 60% by weight or higher, more preferably 70% by weight or higher (e.g. 80% by weight or higher, or even 90% by weight or higher). In a preferable embodiment, the (meth)acrylic oligomer has a monomer composition essentially consisting of a (meth)acrylate monomer.

As the monomers forming the (meth)acrylic oligomer, a functional group-containing monomer can be used in addition to the (meth)acrylate monomer. Favorable examples of the functional group-containing monomer include a monomer having a nitrogen-containing ring (typically, a nitrogen-containing heterocycle) such as N-vinyl-2-pyrrolidone and N-acryloylmorpholine; an amino group-containing monomer such as N,N-dimethylaminoethyl (meth)acrylate; an amide group-containing monomer such as N,N-diethyl (meth)acrylamide; a carboxyl group-containing monomer such as AA and MAA; and a hydroxy group-containing monomer such as 2-hydroxyethyl (meth)acrylate. Of these functional group-containing monomers, solely one species or a combination of two or more species can be used. Among them, the carboxyl group-containing monomer is preferable and AA is particularly preferable.

When all the monomers forming the (meth)acrylic oligomer includes a functional group-containing monomer, the ratio of the functional group-containing monomer (e.g. a carboxyl group-containing monomer such as AA) to all the monomers is suitably about 1% by weight or higher, preferably 2% by weight or higher, or more preferably 3% by weight or higher; it is suitably about 15% by weight or lower, preferably 10% by weight or lower, or more preferably 7% by weight or lower.

The (meth)acrylic oligomer can be formed by polymerizing its monomer components. The method or embodiment of polymerization is not particularly limited. Various heretofore known polymerization methods (e.g. solution polymerization, emulsion polymerization, bulk polymerization, photopolymerization, radiation polymerization, etc.) can be employed in suitable embodiments. The species of polymerization initiator (e.g. an azo-based polymerization initiator such as AIBN) that can be used as necessary is generally as exemplified in the synthesis of acrylic polymer. The amounts of polymerization initiator and optionally-used chain transfer agent such as n-dodecyl mercaptan can be suitably selected based on common technical knowledge so as to obtain a desirable molecular weight. Details are thus omitted here.

From the same standpoint, preferable examples of the (meth)acrylic oligomer include the respective homopolymers of dicyclopentanyl methacrylate (DCPMA), cyclohexylmethacrylate (CHMA), isobornyl methacrylate (IBXMA), isobornyl acrylate (IBXA), dicyclopentanyl acrylate (DCPA), 1-adamanthyl methacrylate (ADMA), and 1-adamanthyl acrylate (ADA); as well as a copolymer of CHMA and isobutyl methacrylate (IBMA), copolymer of CHMA and IBXMA, copolymer of CHMA and acryloyl morpholine (ACMO), copolymer of CHMA and diethylacrylamide (DEAA), copolymer of CHMA and AA, copolymer of ADA and methyl methacrylate (MMA), copolymer of DCPMA and IBXMA, and copolymer of DCPMA and MMA.

When the PSA composition disclosed herein includes a (meth)acrylic oligomer, its amount included relative to 100 parts by weight of the acrylic polymer is suitably, for instance, 0.1 part by weight or greater (e.g. 1 part by weight or greater). To obtain greater effect of the (meth)acrylic oligomer, the (meth)acrylic oligomer content is preferably about 5 parts by weight or greater, more preferably about 8 parts by weight or greater, yet more preferably about 10 parts by weight or greater, or particularly preferably about 12 parts by weight or greater. From the standpoint of the compatibility with the acrylic polymer, etc., the (meth)acrylic oligomer content is suitably less than 50 parts by weight (e.g. less than 40 parts by weight), preferably less than 30 parts by weight, more preferably about 25 parts by weight or less, or yet more preferably about 20 parts by weight or less.

In a preferable embodiment, the PSA composition (as well as the PSA layer) includes one, two or more species of aforementioned tackifier resins and one, two or more species of (meth)acrylic oligomers. In a composition that includes a high molecular weight acrylic polymer, with the combined use of tackifier resin and (meth)acrylic oligomer, while obtaining excellent light-pressure initial adhesion, highly great deformation resistance to a continuous z-axial load can also be obtained even in an application exposed to harsher conditions such as strong repulsion. The tackifier resin content $C_T$ to (meth)acrylic oligomer content $C_O$ ratio is not particularly limited. For instance, $C_T:C_O$ is suitably 1:9 to 9:1, preferably 2:8 to 8:2, more preferably 3:7 to 7:3, or yet more preferably 4:6 to 6:4.

From the standpoint of obtaining preferable effect of the art disclosed herein, the combined amount (total amount) of tackifier resin and (meth)acrylic oligomer in the PSA composition (as well as the PSA layer) according to a preferable embodiment is suitably about 1 part by weight or greater, preferably about 10 parts by weight or greater, more preferably about 16 parts by weight or greater, yet more preferably 20 parts by weight or greater, or particularly preferably 25 parts by weight or greater; it is suitably less than 120 parts by weight (e.g. about 80 parts by weight or less), preferably less than 60 parts by weight, more preferably about 50 parts by weight or less, or yet more preferably about 40 parts by weight or less.

(Other Additives)

The PSA composition may comprise, as necessary, various additives generally known in the field of PSA, such as leveling agent, crosslinking accelerator, plasticizer, softener, anti-static agent, anti-aging agent, UV absorber, antioxidant and photo-stabilizer. With respect to these various additives, heretofore known species can be used by typical methods. As they do not characterize the present invention in particular, details are omitted.

The PSA layer disclosed herein can be formed by a heretofore known method. For instance, it is possible to employ a direct method where the PSA composition is directly provided (typically applied) to a non-releasable substrate and allowed to dry or cure to form a PSA layer. Alternatively, the PSA composition can be provided to a releasable surface (e.g. a release face) and allowed to dry or cure to form a PSA layer on the surface, whereby a substrate-free PSA sheet consisting of the PSA layer can be fabricated. It is further possible to employ a transfer method where the PSA layer formed on the release face is transferred to a non-releasable substrate. As the release face, the surface of a release liner, the substrate's back side treated with release agent, or the like can be used. The PSA layer disclosed herein is not limited to, but typically formed in a continuous form. For instance, the PSA layer may be formed in a regular or random pattern of dots, stripes, etc.

The PSA composition can be applied by various known methods. Specific examples include methods such as roll coating, kiss roll coating, gravure coating, reverse coating, roll brush coating, spray coating, dip roll coating, bar coating, knife coating, air knife coating, curtain coating, lip coating, and extrusion coating with a die coater or the like.

In an embodiment of the art disclosed herein, from the standpoint of accelerating the crosslinking reaction and increasing the productivity of manufacturing, the PSA composition is preferably dried with heating. The drying temperature can be, for instance, about 40° C. to 150° C., or usually preferably about 60° C. to 130° C. After dried, the PSA composition may be aged for purposes such as adjusting the migration of components in the PSA layer and the progress of the crosslinking reaction, and lessening deformation possibly present in the substrate film and the PSA layer.

The PSA sheet disclosed herein can be preferably produced by a method that includes allowing a wet layer of the PSA composition on a release face of a release film to dry or cure to form a PSA layer in which the face cured on the release face is a first adhesive face. This method allows more precise control of the smoothness of the PSA layer surface formed in contact with the release face by means of drying or curing a fluid PSA composition (wet layer) in contact with the release face. For instance, with the use of a release film having a suitably smooth release face, the first adhesive face can be consistently (reproducibly) produced to have desirable smoothness.

The PSA sheet disclosed herein can be preferably produced by a method that includes allowing a wet layer of the PSA composition to dry or cure between release faces of a pair of release films to form a PSA layer. This method is preferable as a method for producing a substrate-free double-faced PSA sheet. By adhering the substrate-free double-faced PSA sheet thus obtained to a non-releasable face of a support substrate, it can be preferably applied to production of a substrate-supported single-faced PSA sheet and a substrate-supported double-faced PSA sheet. As the method for placing the wet layer of the PSA composition between release faces of a pair of release films, it is possible to use a method that applies the fluid PSA composition to a release face of the first release film and then covers the wet layer of the PSA composition with the second release film. In another method cited, the first and second release films are placed between a pair of rolls, with their release faces facing each other; and the fluid PSA composition is supplied between their release faces.

The thickness of the PSA layer is not particularly limited. The thickness of the PSA layer is usually suitably about 300 µm or less, preferably about 200 µm or less, more preferably about 150 µm or less, or yet more preferably about 100 µm or less. In the PSA sheet according to a preferable embodiment, the PSA layer has a thickness of about 70 µm or less (usually 60 µm or less); it can also be, for instance, about 50 µm or less, or even about 40 µm or less. The minimum thickness of the PSA layer is not particularly limited. From the standpoint of the adhesion and adherend conformability, it is advantageously about 3 µm or greater, preferably about 6 µm or greater, more preferably about 10 µm or greater (e.g. about 15 µm or greater), yet more preferably about 25 µm or greater, for instance, about 35 µm or greater, or even about 45 µm or greater. For instance, the art disclosed herein can be favorably implemented in a PSA sheet form that comprises a PSA layer having a thickness of about 10 µm or greater and about 150 µm or less (preferably about 15 µm or greater and about 50 µm or less). A favorable example is a substrate-free, adhesively double-faced PSA sheet formed solely of a PSA layer having such a thickness.

(Gel Fraction)

While no particular limitations are imposed, the gel fraction (by weight) of the PSA layer disclosed herein can be, for instance, 20% or higher, usually suitably 30% or higher, or preferably 35% or higher. With increasing gel fraction of the PSA layer in a suitable range, deformation resistance to a continuous z-axial load tends to be more likely obtained. In the art disclosed herein, the PSA layer more preferably has a gel fraction of 40% or higher. The gel fraction is yet more preferably 45% or higher, or particularly preferably 50% or higher. The gel fraction can also be, for instance, 55% or higher. On the other hand, an excessively high gel fraction may result in insufficient light-pressure initial adhesion. From such a standpoint, the gel fraction of the PSA layer is preferably 90% or lower, more preferably 80% or lower, or yet more preferably 70% or lower (e.g. 65% or lower).

Here, the "gel fraction of the PSA layer" refers to the value determined by the next method. The gel fraction is thought as the weight ratio of the ethyl acetate-insoluble part of the PSA layer.

[Method for Determining Gel Fraction]

A PSA sample (weight: $W_{g1}$) weighing approximately 0.1 g is wrapped into a pouch with a porous polytetrafluoroethylene membrane (weight: $Wg_2$) having an average pore diameter of 0.2 µm, and the opening is tied with twine (weight: $Wg_3$). As the porous polytetrafluoroethylene (PTFE) membrane, trade name NITOFLON® NTF 1122 available from Nitto Denko Corp. (0.2 µm average pore diameter, 75% porosity, 85 µm thick) or an equivalent product is used.

The resulting pouch is immersed in 50 mL of ethyl acetate and stored at room temperature (typically 23° C.) for 7 days to extract sol in the PSA layer out of the membrane. Subsequently, the pouch is collected, and any residual ethyl acetate is wiped off the outer surface. The pouch is dried at 130° C. for 2 hours and the pouch's weight ($Wg_4$) is measured. The gel fraction $F_G$ of the PSA layer is determined by substituting the respective values into the equation shown below. The same method is used in the working examples described later.

Gel Fraction $F_G(\%)=[(Wg_4-Wg_2-Wg_3)/Wg_1] \times 100$

<Substrate>

In an embodiment where the PSA sheet disclosed herein is a single-faced or double-faced on-substrate PSA sheet, as the substrate to support (back) the PSA layer(s), resin film, foam film (foam substrate), paper, fabrics, metal foil, a composite of these and the like can be used.

The art disclosed herein can be implemented in an embodiment of an on-substrate PSA sheet having the PSA layer on at least one face of a substrate film (support). For instance, it can be made in an embodiment of an on-substrate double-faced PSA sheet having the PSA layer on each face of a substrate film.

A preferable substrate film includes resin film as its base film. The base film is typically a component capable of holding its shape by itself (self-standing). The substrate film in the art disclosed herein may be formed essentially of such base film. Alternatively, the substrate film may include a secondary layer besides the base film. Examples of the secondary layer include a primer layer, an antistatic layer, a colored layer and the like provided to the surface of the base film.

The resin film comprises a resin material as its primary component (a component accounting for more than 50% by weight of the resin film). Examples of the resin film include polyolefinic resin film such as polyethylene (PE), polypropylene (PP), and ethylene-propylene copolymer; polyester-based resin film such as polyethylene terephthalate (PET), polybutylene terephthalate (PBT), and polyethylene naphthalate (PEN); polyvinylic resin film; vinyl acetate-based resin film; polyimide-based resin film; polyamide-based resin film; fluororesin film; and cellophane. The resin film can be rubber-based film such as natural rubber film and butyl rubber film. Among them, from the standpoint of the ease of handling and processing, polyester film is preferable. In particular, PET film is especially preferable. As used herein, the "resin film" is typically a non-porous sheet and its concept is distinguished from so-called non-woven fabrics and woven fabrics (in other words, its concept excludes non-woven fabrics and woven fabrics).

The resin film may have a mono-layer structure or a multi-layer structure with two, three or more layers. From the standpoint of the shape stability, the resin film preferably has a mono-layer structure. In case of a multi-layer structure, at least one layer (preferably each layer) has a continuous structure formed of the resin (e.g. polyester-based resin). The method for producing the resin film is not particularly limited and a heretofore known method can be suitably employed. For instance, heretofore known general film formation methods can be suitably employed, such as extrusion molding, inflation molding, T-die casting and calendar rolling.

In another embodiment, as the substrate material, paper, fabrics and metal are used. Examples of the paper that can be used in the substrate film include Japanese paper, Kraft paper, glassine paper, high-grade paper, synthetic paper, and top-coated paper. Examples of fabrics include woven fabrics and nonwoven fabrics of pure or blended yarn of various fibrous materials. Examples of fibrous materials include cotton, staple cloth, Manila hemp, pulp, rayon, acetate fiber, polyester fiber, polyvinyl alcohol fiber, polyamide fiber, and polyolefin fiber. Examples of metal foil that can be used in the substrate film include aluminum foil and copper foil.

The concept of non-woven fabric as used herein primarily refers to non-woven fabric for PSA sheets used in the field of PSA tapes and other PSA sheets, typically referring to non-woven fabric (or so-called "paper") fabricated using a general paper machine. Resin film herein is typically a non-porous resin sheet and its concept is distinct from, for instance, non-woven fabric (i.e. excludes non-woven fabric). The resin film may be any of non-stretched film, uni-axially stretched film and bi-axially stretched film. The substrate's surface to be provided with a PSA layer may be subjected to a surface treatment such as primer coating, corona discharge treatment, and plasma treatment.

The resin film (e.g. PET film) may include, as necessary, various additives such as filler (inorganic filler, organic filler, etc.), colorant, dispersing agent (surfactant, etc.), anti-aging agent, antioxidant, UV absorber, antistatic agent, slip agent and plasticizer. The ratio of the various additives is usually below about 30% by weight (e.g. below about 20% by weight, preferably below about 10% by weight).

The surface of the substrate film may be subjected to heretofore known surface treatment such as corona discharge treatment, plasma treatment, UV irradiation, acid treatment, base treatment, and primer coating. Such surface treatment may enhance the tightness of adhesion between the substrate film and the PSA layer, that is, the anchoring of the PSA layer onto the substrate film.

The thickness of the substrate film disclosed herein is not particularly limited. From the standpoint of avoiding making the PSA sheet excessively thick, the thickness of the substrate film (e.g. resin film) can be, for instance, about 200 μm or less, preferably about 150 μm or less, or more preferably about 100 μm or less. In accordance with the purpose and the way of using the PSA sheet, the thickness of the substrate film can be about 70 μm or less, about 50 μm or less, or even about 30 μm or less (e.g. about 25 μm or less). In an embodiment, the thickness of the substrate film can be about 20 μm or less, about 15 μm or less, or even about 10 μm or less (e.g. about 5 μm or less). The thickness of the substrate film can be reduced to increase the thickness of the PSA layer without changing the total thickness of the PSA sheet. This may be advantageous from the standpoint of enhancing the tightness of adhesion to the substrate. The minimum thickness of the substrate film is not particularly limited. From the standpoint of the ease of handling and processing the PSA sheet, etc., the thickness of the substrate film is usually about 0.5 μm or greater (e.g. 1 μm or greater), or preferably about 2 μm or greater, for instance, about 4 μm or greater. In an embodiment, the thickness of the substrate film can be about 6 μm or greater, about 8 μm or greater, or even about 10 μm or greater (e.g. greater than 10 μm).

<Foam Substrate>

In another preferable embodiment, a foam substrate is used as the substrate. The foam substrate disclosed herein is a substrate that comprises some part having pores (a pore structure), typically a substrate that includes at least one layer of foam (a foam layer). The foam substrate may be formed of one, two or more foam layers. For instance, the foam substrate can be essentially formed of one, two or more foam layers solely. While no particular limitations are imposed, a favorable example of the foam substrate in the art disclosed herein is a foam substrate formed of a single (one) foam layer.

The thickness of the foam substrate is not particularly limited and can be suitably selected in accordance with the strength, flexibility and purpose of the PSA sheet, etc. In view of making thinner products, the thickness of the foam substrate is usually 1 mm or less, suitably 0.70 mm or less, preferably 0.40 mm or less, or more preferably 0.30 mm or less. From the standpoint of the ease of processing, etc., the art disclosed herein can be preferably implemented in an embodiment where the foam substrate has a thickness of 0.25 mm or less (typically 0.18 mm or less, e.g. 0.16 mm or less). From the standpoint of the impact resistance of the PSA sheet, etc., the thickness of the foam substrate is usually 0.04 mm or greater, suitably 0.05 mm or greater, preferably 0.06 mm or greater, or more preferably 0.07 mm or greater (e.g. 0.08 mm or greater). The art disclosed herein can be preferably implemented in an embodiment where the foam substrate has a thickness of 0.10 mm or greater (typically greater than 0.10 mm, preferably 0.12 mm or greater, e.g. 0.13 mm or greater). With increasing thickness of the foam substrate, the impact resistance tends to be improved.

The density (apparent density; the same applies hereinafter unless otherwise noted) of the foam substrate is not particularly limited. It can be, for instance, 0.1 g/cm$^3$ to 0.9 g/cm$^3$. From the standpoint of the impact resistance, the density of the foam substrate is suitably 0.8 g/cm$^3$ or less, or preferably 0.7 g/cm$^3$ or less (e.g. 0.6 g/cm$^3$ or less). In an embodiment, the density of the foam substrate can be 0.5 g/cm$^3$ or less (e.g. less than 0.5 g/cm$^3$) or even less than 0.4 g/cm$^3$. From the standpoint of the impact resistance, the density of the foam substrate is preferably 0.12 g/cm$^3$ or greater, more preferably 0.15 g/cm$^3$ or greater, or yet more preferably 0.2 g/cm$^3$ or greater (e.g. 0.3 g/cm$^3$ or greater). In an embodiment, the density of the foam substrate can be 0.4 g/cm$^3$ or greater, 0.5 g/cm$^3$ or greater (e.g. greater than 0.5 g/cm$^3$), or even 0.55 g/cm$^3$ or greater. The density (apparent density) of a foam substrate can be determined based on JIS K 6767.

The mean pore diameter of the foam substrate is not particularly limited. From the standpoint of stress dispersion, it is preferably 300 μm or less, more preferably 200 μm or less, or yet more preferably 150 μm or less. The minimum mean pore diameter is not particularly limited. From the standpoint of the conformability to contours, it is usually suitably 10 μm or greater, preferably 20 μm or greater, more preferably 30 μm or greater, or yet more preferably 40 μm or greater (e.g. 50 μm or greater). In an embodiment, the mean pore diameter can be 55 μm or greater, or even 60 μm or greater. As used herein, the mean pore diameter refers to the mean pore diameter based on equivalent spheres, determined by electron microscopy analysis of a cross section of the foam substrate.

The pore structure of the foam forming the foam substrate disclosed herein is not particularly limited. The pore structure can be formed of connected pores, disconnected pores, or half-connected half-disconnected pores. From the standpoint of the impact absorption, a disconnected pore structure and a half-connected half-disconnected pore structure are preferable.

The 25% compressive strength $C_{25}$ of the foam substrate is not particularly limited. For instance, it can be 20 kPa or greater (typically 30 kPa or greater, or even 40 kPa or greater). $C_{25}$ is usually suitably 250 kPa or greater, or preferably 300 kPa or greater (e.g. 400 kPa or greater). The PSA sheet having such a foam substrate may exhibit good resistance to impact by dropping, etc. For instance, impact tearing of the PSA sheet may be better prevented. The maximum $C_{25}$ is not particularly limited; it is usually suitably 1300 kPa or less (e.g. 1200 kPa or less). In an embodiment, $C_{25}$ can be 1000 kPa or less, 800 kPa or less, 600 kPa or less (e.g. 500 kPa or less), or even 360 kPa or less. In another preferable embodiment, the $C_{25}$ of the foam substrate can be 20 kPa to 200 kPa (typically 30 kPa to 150 kPa, e.g. 40 kPa to 120 kPa). The PSA sheet comprising such a foam substrate may have excellent cushioning properties. For instance, the foam substrate can absorb dropping impact to better prevent peeling of the PSA sheet.

The 25% compressive strength $C_{25}$ of a foam substrate refers to the load required to compress a specimen placed between a pair of flat plates by a thickness equivalent to 25% of the initial thickness (load at 25% compressibility), with the specimen obtained by layering 30 mm square cut pieces of the foam substrate to a thickness of about 2 mm. That is, it refers to the load required to compress the specimen to a thickness equivalent to 75% of the initial thickness. The compressive strength is determined based on JIS K 6767. In specific procedures, the specimen is set at the center of the pair of flat plates, the flat plates are moved to narrow the inter-plate distance and continuously compress the specimen to the prescribed compressibility, and the load at 10 seconds after the flat plates are stopped is measured. The compressive strength of the foam substrate can be controlled, for instance, through the degree of crosslinking and the density of the material forming the foam substrate as well as sizes and shapes of pores, etc.

The tensile elongation of the foam substrate is not particularly limited. For instance, a foam substrate having a machine direction (MD) tensile elongation of 200% to 800% (more preferably 400% to 600%) can be favorably used. A preferable foam substrate has a transverse direction (TD) tensile elongation of 50% to 800% (more preferably 200% to 500%). The elongation of a foam substrate is determined based on JIS K 6767. The elongation of the foam substrate can be controlled through, for instance, the degree of crosslinking, apparent density (expansion rate), etc.

The tensile strength of the foam substrate is not particularly limited. For instance, a foam substrate having a machine direction (MD) tensile strength of 5 MPa to 35 MPa (preferably 10 MPa to 30 MPa) can be favorably used. A preferable foam substrate has a transverse direction (TD) tensile strength of 1 MPa to 25 MPa (more preferably 5 MPA to 20 MPa). The tensile strength of a foam substrate is determined based on JIS K 6767. The tensile strength of the foam substrate can be controlled through, for instance, the degree of crosslinking, apparent density (expansion ratio), etc.

The material of the foam substrate is not particularly limited. Usually, a foam substrate including a foam layer formed of foam of a plastic material (plastic foam). There are no particular limitations to the plastic material (including a rubber material) for forming the plastic foam. A suitable species can be selected among known plastic materials. For the plastic material, solely one species or a suitable combination of two or more species can be used.

Specific examples of the plastic foam include polyolefinic resin foam such as PE foam and PP foam; polyester-based resin foam such as PET foam, PEN foam and PBT foam; polyvinyl chloride-based resin foam such as polyvinyl chloride foam; vinyl acetate-based resin foam; polyphenylene sulfide resin foam; amide-based resin foam such as aliphatic polyamide (nylon) resin foam and all aromatic polyamide (aramide) resin foam; polyimide resin foam; polyether ether ketone (PEEK) foam; styrene-based resin foam such as polystyrene foam; and urethane-based resin foam such as polyurethane resin foam. As the plastic foam, rubber-based resin foam such as polychloroprene rubber foam can be used as well.

Examples of preferable foam include polyolefinic resin foam (or polyolefinic foam, hereinafter). As the plastic material (i.e. a polyolefinic resin) constituting the polyolefinic foam, various known or conventional polyolefinic resins can be used without any particular limitations. Examples include PE such as low density polyethylenes (LDPE), linear low density polyethylenes (LLDPE), and high density polyethylenes (HDPE); PP; ethylene-propylene copolymers; and ethylene-vinyl acetate copolymers. Examples of LLDPE include Ziegler-Natta catalyst-based linear low density polyethylenes and metallocene-catalyst-based linear low density polyethylenes. These polyolefinic resins can be used singly as one species or in a combination of two or more species.

From the standpoint of the impact resistance, waterproof properties, anti-dust properties, etc., favorable examples of the foam substrate in the art disclosed herein include polyolefinic foam substrates such as a PE-based foam substrate formed essentially of PE-based resin foam and a PP-based foam substrate formed essentially of PP-based resin foam. Here, the PE-based resin refers to a resin wherein ethylene is the primary monomer (i.e., the primary component among monomers), possibly including HDPE, LDPE and LLDPE as well as ethylene-propylene copolymers and ethylene-vinyl acetate copolymers each having a copolymerization ratio of ethylene above 50% by weight, and the like. Similarly, the PP-based resin refers to a resin wherein propylene is the primary monomer. As the foam substrate in the art disclosed herein, a PE-based foam substrate can be preferably used.

The method for producing the plastic foam (typically polyolefinic foam) is not particularly limited. Various known methods can be suitably employed. For instance, it can be produced by a method that includes a molding step, a crosslinking step and a foaming step of the plastic foam. It may also include a stretching step as necessary.

Examples of the method for crosslinking the plastic foam include a chemical crosslinking method that uses an organic peroxide, etc.; and an ionizing radiation crosslinking method involving irradiation of ionizing radiation. These methods can be used together. Examples of the ionizing radiation include electron beam, α rays, β rays and γ rays. The dose of ionizing radiation is not particularly limited. It can be set at a suitable irradiation dose in view of target physical properties (e.g. degree of crosslinking) of the foam substrate, etc.

The foam substrate may comprise various additives as necessary such as filler (inorganic filler, organic filler, etc.), anti-aging agent, antioxidant, UV absorber, anti-static agent, slipping agent, plasticizers, flame retardant, and surfactant.

The foam substrate in the art disclosed herein may be colored to black, white, etc., in order to bring about desirable design or optical properties (e.g. light-blocking properties, light-reflecting properties, etc.) in a PSA sheet comprising the foam substrate. For the coloring, among known organic or inorganic colorants, solely one species or a combination of two or more species can be used.

The surface of the foam substrate may be subjected to suitable surface treatment as necessary. The surface treatment can be, for instance, chemical or physical treatment to increase the tightness of adhesion with the adjacent material (e.g. a PSA layer). Examples of such surface treatment include corona discharge treatment, chromic acid treatment, ozone exposure, flame exposure, UV irradiation, plasma treatment, and primer coating.

<Release Liner>

In the art disclosed herein, a release liner can be used during formation of a PSA layer; fabrication of a PSA sheet; storage, distribution and shape machining of a PSA sheet prior to use, etc. The release liner is not particularly limited. For example, a release liner having a release layer on the surface of a liner substrate such as resin film and paper; a release liner formed from a low adhesive material such as a fluoropolymer (polytetrafluoroethylene, etc.) or a polyolefinic resin (PE, PP, etc.); or the like can be used. The release layer can be formed, for instance, by subjecting the liner substrate to a surface treatment with a release agent such as a silicone-based, long-chain alkyl-based, fluorine-based, or molybdenum disulfide-based release agent.

<Psa Sheet>

The PSA sheet disclosed herein preferably satisfies at least one of the following features: having a 180° peel strength at 23° C. (23° C. light-pressure initial adhesive strength) of 8 N/20 mm or greater when determined within one minute after press-bonded at a press-bonding load of 0.1 kg or having a 180° peel strength at 40° C. (40° C. light-pressure initial adhesive strength) of 8 N/20 mm or greater when determined within one minute after press-bonded at 0.05 MPa for 3 seconds. The PSA sheet satisfying this feature may preferably show excellent initial adhesion to an adherend surface when lightly press-bonded at around room temperature or at a limited heating temperature. The PSA sheet can achieve desirable light-pressure initial adhesion in the aforementioned press-bonding temperature range; and therefore, even for purposes (e.g. for electronics) for which heating at a temperature above 60° C. is not plausible, it can be preferably used in an embodiment where it is applied at around room temperature or with mild heating. Such a PSA sheet is superior in handling properties as well when compared to conventional thermal press-bonding.

Determined within one minute after press-bonded at 23° C. at a press-bonding load of 0.1 kg, the PSA sheet disclosed herein preferably exhibits a 180° peel strength (23° C. light-pressure initial adhesive strength) of 8 N/20 mm or greater. Satisfying this feature, it may show excellent light-pressure initial adhesion to various types of adherends (e.g. materials used as components of mobile electronics). The PSA sheet with excellent light-pressure initial adhesion is also advantageous as it is easily applied to brittle adherends that may be damaged by typical press-bonding. The 23° C. light-pressure initial adhesive strength is more preferably 10 N/20 mm or greater, yet more preferably 12 N/20 mm or greater, or particularly preferably 14 N/20 mm or greater. The maximum 23° C. light-pressure initial adhesive strength is not particularly limited; it is usually suitably about 30 N/20 mm or less (e.g. about 20 N/20 mm or less). In particular, the 23° C. light-pressure initial adhesive strength is determined by the method described later in the working examples.

Determined within one minute after press-bonded at 40° C. at 0.05 MPa for 3 seconds, the PSA sheet disclosed herein preferably exhibits a 180° peel strength (40° C. light-pressure initial adhesive strength) of 8 N/20 mm or greater. Satisfying this feature, it may show excellent light-pressure initial adhesion by thermal press-bonding with heating at around 40° C. (i.e. by mild thermal press-bonding). Unlike conventional thermal press-bonding carried out at around 100° C., this thermal press-bonding can be applied to electronics. The 40° C. light-pressure initial adhesive strength is more preferably 10 N/20 mm or greater, yet more preferably 12 N/20 m or greater, particularly preferably 14 N/20 mm or greater, or most preferably 18 N/20 mm or greater. The maximum 40° C. light-pressure initial adhesive strength is not particularly limited; it is usually suitably about 30 N/20 mm or less (e.g. about 25 N/20 mm or less). In particular, the 40° C. light-pressure initial adhesive strength is determined by the method described later in the working examples.

The PSA sheet disclosed herein may have a passing level of deformation resistance (i.e. it may not peel off) in the z-axial deformation resistance test (at 23° C. or 40° C.), determined using 75 μm thick PET film in the method described later in the working examples. The PSA sheet satisfying this feature shows excellent light-pressure adhesion and deformation resistance to peel load applied essentially only in the thickness direction (z-axial direction) of the PSA sheet and is less likely to deform under a continuous peel load applied in this direction.

In the working examples described later, the PSA sheet disclosed herein may show a lift-off height less than 1000 μm at the end of measurement in a z-axial deformation resistance test carried out at 65° C. at 90% RH for 72 hours, using 125 μm thick PET film. The PSA sheet satisfying this feature has especially great deformation resistance to a peel load applied essentially solely in the thickness direction (z-axis direction) of the PSA sheet and it is less likely to deform under a continuous peel load applied in the same direction. The PSA sheet can also show stable deformation resistance even when it is applied on adherends (e.g. mobile electronics and modules as their components) and exposed to a high-temperature, high-humidity environment while being stored, etc. The lift-off height is preferably less than 700 μm, more preferably less than 500 μm, yet more preferably less than 300 μm, or particularly preferably less than 200 μm (e.g. less than 150 μm). The lift-off height is the height of the PSA sheet including its thickness (50 μm in the working examples described later).

The PSA sheet disclosed herein preferably exhibits a 30-min aged adhesive strength of 8 N/20 mm or greater, determined based on JIS Z 0237:2000. A PSA sheet showing such 30-min aged adhesive strength exhibits good adhesion to adherend. The PSA sheet having such adhesive strength tends to show good adhesion to resin materials used for electronics, such as polycarbonate (PC) and polyimide (PI). The 30-min aged adhesive strength is more preferably 10 N/20 mm or greater, yet more preferably 12 N/20 mm or greater, or particularly preferably 14 N/20 mm or greater (e.g. 18 N/20 mm or greater). The maximum 30-min aged adhesive strength is not particularly limited; it is usually suitably about 30 N/20 mm or less (e.g. about 25 N/20 mm or less). In particular, the 30-min aged adhesive strength is determined by the method described later in the working examples.

The PSA sheet according to a preferable embodiment preferably has a manifestation rate of 23° C. light-pressure initial adhesive strength above 50%. The manifestation rate of 23° C. light-pressure initial adhesive strength can be determined by the equation: manifestation rate of 23° C. light-pressure initial adhesive strength (%)=(23° C. light-pressure initial adhesive strength/30-min aged adhesive strength)×100. The 23° C. light-pressure initial adhesive strength and the 30-min aged adhesive strength are in the same unit (typically in N/20 mm). The PSA sheet showing such a manifestation rate shows greater 23° C. light-pressure initial adhesive strength relative to its aged adhesive strength; and therefore, it is preferably used for an application that requires good adhesion immediately after its application with light pressure. The manifestation rate of 23° C. light-pressure initial adhesive strength is more preferably 55% or higher, yet more preferably 60% or higher, or particularly preferably 65% or higher. Certain techniques disclosed herein can be combined to raise the manifestation rate to 70% or above, or even to 75% or above. The maximum manifestation rate of 23° C. light-pressure initial adhesive strength is ideally 100%, but it can be about 90% or lower (e.g. 85% or lower) as well.

The PSA sheet according to another preferable embodiment preferably has a manifestation rate of 40° C. light-pressure initial adhesive strength above 50%. The manifestation rate of 40° C. light-pressure initial adhesive strength can be determined by the equation: manifestation rate of 40° C. light-pressure initial adhesive strength (%)=(40° C. light-pressure initial adhesive strength/30-min aged adhesive strength)×100. The 40° C. light-pressure initial adhesive strength and the 30-min aged adhesive strength are in the same unit (typically in N/20 mm). Satisfying this feature, by thermal press-bonding with heating at around 40° C., the PSA sheet may show excellent light-pressure initial adhesion. The manifestation rate of 40° C. light-pressure initial adhesive strength is more preferably 55% or higher, yet more preferably 60% or higher, or particularly preferably 65% or higher. Certain techniques disclosed herein can be combined to raise the manifestation rate to 70% or above, or even to 75% or above. The maximum manifestation rate of 40° C. light-pressure initial adhesive strength is ideally 100%, but it can be about 90% or lower (e.g. 85% or lower) as well.

When the PSA sheet disclosed herein is a substrate-free PSA sheet consisting essentially of the PSA layer, the PSA sheet may have a storage modulus at 25° C., G'(25° C.), of 0.15 MPa or greater. The PSA sheet having such a storage modulus G'(25° C.) may preferably show good deformation resistance in an early stage after its application to adherend. The G'(25° C.) is preferably 0.17 MPa or greater, more preferably 0.2 MPa or greater, or yet more preferably 0.23 MPa or greater. The G'(25° C.) is particularly preferably 0.25 MPa or greater; it can also be, for instance, 0.3 MPa or greater. The G'(25° C.) is usually suitably 1.0 MPa or less. From the standpoint of combining light-pressure initial adhesion and deformation resistance, it is preferably 0.6 MPa or less, more preferably 0.4 MPa or less, or yet more preferably 0.35 MPa or less; it can also be, for instance, 0.3 MPa or less, 0.25 MPa or less, or even 0.2 MPa or less.

When the PSA sheet disclosed herein is a substrate-free PSA sheet consisting essentially of the PSA layer, the PSA sheet may have a storage modulus at 85° C., G'(85° C.), of 0.02 MPa or greater. This can preferably bring about a PSA sheet having continuous deformation resistance. The G'(85° C.) is specifically 0.022 MPa or greater, preferably 0.025 MPa or greater, more preferably 0.027 MPa or greater. The G'(85° C.) is yet more preferably about 0.03 MPa or greater (e.g. 0.035 MPa or greater), particularly preferably 0.04 MPa or greater, or more particularly preferably 0.05 MPa or greater. The G'(85° C.) is usually suitably 1.0 MPa or less, for instance, 0.5 MPa or less, typically 0.1 MPa or less. The G'(85° C.) value can also be 0.05 MPa or less.

When the PSA sheet disclosed herein is a substrate-free PSA sheet consisting essentially of the PSA layer, from the standpoint of the light-pressure initial adhesion, the PSA sheet may have a storage modulus G'(apply) of 0.6 MPa or less at the temperature where the PSA sheet is press-bonded to adherend (press-bonding temperature). The G'(apply) is preferably 0.4 MPa or less, or more preferably 0.35 MPa or less; it can also be, for instance, 0.3 MPa or less, or even 0.25 MPa or less. The G'(apply) can also be, for instance, 0.2 MPa or less. From the standpoint of combining light-pressure initial and deformation resistance, the G'(apply) is suitably greater than 0.12 MPa, preferably 0.15 MPa or greater, more preferably 0.17 MPa or greater (e.g. 0.2 MPa or greater), or yet more preferably 0.25 MPa or greater; it can also be, for instance, 0.3 MPa or greater. The press-bonding temperature is selected from a range above 0° C. and below 60° C. in view of the ease of press-bonding, temperature management, etc. In case of a PSA sheet used for mobile electronics applications, because of the temperature limitation in these applications, the press-bonding temperature is desirably selected from a range between 20° C. and 45° C. (typically 25° C. or 40° C.).

When the PSA sheet disclosed herein is a substrate-free PSA sheet consisting essentially of the PSA layer, the PSA sheet usually suitably exhibits a loss modulus at 25° C., G"(25° C.), of 2.0 MPa or less. The G"(25° C.) is preferably 1.5 MPa or less, more preferably 1.0 MPa or less, or yet more preferably 0.5 MPa or less. The G"(25° C.) can also be 0.3 MPa or less (e.g. 0.25 MPa or less). The G" (25° C.) is usually suitably 0.01 MPa or greater. From the standpoint of the ease of wetting the adherend surface as well as light-pressure initial adhesion, etc., it is preferably 0.05 MPa or greater, more preferably 0.1 MPa or greater, or yet more preferably 0.2 MPa or greater; it can also be, for instance, 0.25 MPa or greater.

When the PSA sheet disclosed herein is a substrate-free PSA sheet essentially consisting of a PSA layer, at 25° C., the PSA sheet has a loss tangent (tan δ(25° C.)) of, for instance, suitably about 0.3 or greater; from the standpoint of the deformation resistance, it is preferably about 0.5 or greater, more preferably about 0.7 or greater, yet more preferably about 0.8 or greater, or particularly preferably about 0.9 or greater (e.g. about 1 or greater). The tan δ(25° C.) is, for instance, suitably about 3 or less; from the standpoint of the light-pressure initial adhesion, it is preferably about 2 or less, more preferably about 1.5 or less, or yet more preferably 1.2 or less.

When the PSA sheet disclosed herein is a substrate-free PSA sheet essentially consisting of a PSA layer, at 85° C., the PSA sheet has a loss tangent (tan δ(85° C.)) of, for instance, suitably about 0.1 or greater, preferably about 0.2 or greater, more preferably about 0.22 or greater, or yet more preferably 0.24 or greater (e.g. 0.25 or greater). The tan δ(85° C.) is, for instance, suitably about 2 or less, or preferably about 1 or less, or more preferably about 0.5 or less (e.g. about 0.3 or less).

The storage moduli G'(25° C.), G'(85° C.), G'(apply) and loss modulus G"(25° C.) as well as tan δ(25° C.) and tan δ(85° C.) of the PSA sheet can be determined by the same method as for the dynamic elastic modulus measurement of the PSA layer.

The PSA sheet according to a preferable embodiment is a substrate-free, adhesively double-faced PSA sheet (a substrate-free double-faced PSA sheet) essentially consisting of a PSA layer. Such a substrate-free PSA sheet shows excellent conformability; and therefore, it tightly adheres to, for instance, an adherend having an uneven surface (contours) and shows excellent adhesive properties. For fixing rigid materials, it is unsusceptible to uneven press-bonding and is likely to achieve good adhesive fixing. Thus, it can be preferably used for bonding parts of electronics in which rigid parts such as circuit boards and frames that may have contours are internally placed. As for the substrate-free double-faced PSA sheet, its thickness is entirely formed of the PSA layer. Thus, in a space with a limited thickness, it can exhibit greater adhesive strength (e.g. light-pressure adhesion). Thus, it can be particularly preferably used for fixing parts of mobile electronics.

The total thickness of the PSA sheet disclosed herein (excluding any release liner) is not particularly limited. The PSA sheet can have a total thickness of, for instance, about 500 μm or less; it is usually suitably about 350 μm or less, or preferably about 250 μm or less (e.g. about 200 μm or less). The art disclosed herein can be preferably implemented as a PSA sheet (typically a double-faced PSA sheet) having a total thickness of about 150 μm or less (more preferably about 100 μm or less, yet more preferably about less than 60 μm, e.g. about 55 μm or less). The minimum total thickness of the PSA sheet is not particularly limited; it is usually suitably about 10 μm or greater, preferably about 20 μm or greater, or more preferably about 30 μm or greater. When the PSA sheet comprises a foam substrate, the maximum total thickness of the PSA sheet is usually suitably 1.5 mm or less, preferably 1 mm or less, or more preferably 0.5 mm or less.

<Applications>

The PSA sheet disclosed herein combines light-pressure initial adhesion and deformation resistance to a continuous z-axial load. Because of these features, the PSA sheet can be used in various applications that require light-pressure initial adhesion and deformation resistance to a continuous z-axial load. For instance, it can be preferably used in applications where various parts are fixed by light press-bonding. A typical example is fixing parts of various electronics that are produced in mass and thus under strict tact time management. For instance, by using the PSA sheet disclosed herein for fixing parts in various types of mobile devices (portable devices), it is possible to take advantage of the light-pressure initial adhesion obtained at room temperature or with limited heating (at below 60° C., typically mild heating at around 40° C.) that can be applied to electronics, whereby the tact time for manufacturing mobile electronics can be reduced to contribute to an increase in productivity. Non-limiting examples of the mobile electronics include mobile phones, smartphones, tablet PCs, notebook PCs, various wearable devices (e.g. wrist wearables put on wrists such as wrist watches; modular devices attached to bodies with clips, straps, etc.; eye wears including eye glass types (monocular or binocular, including head-mounted pieces); clothing types worn as, for instance, accessories on shirts, socks, hats/caps, etc.; ear-mounted pieces put on ears such as earphones), digital cameras, digital video cameras, acoustic equipment (portable music players, IC recorders, etc.), calculators (e.g. pocket calculators), handheld game devices, electronic dictionaries, electronic notebooks, electronic books, vehicle navigation devices, portable radios, portable TVs, portable printers, portable scanners, and portable modems. In this description, to be "mobile (portable)," it is unsatisfactory to be simply capable of being carried. Instead, it indicates a level of mobility (portability) that allows for relatively easy carriage by hand of an individual (a typical adult).

The PSA sheet (typically a double-faced PSA sheet) disclosed herein can be processed to obtain bonding materials in various shapes and used for fixing parts constituting mobile electronics such as those listed earlier. In particular, it can be preferably used in mobile electronics having liquid crystal displays. For instance, the PSA sheet disclosed herein is preferably used for fixing a flexible adherend in an electronic device (typically a mobile electronic device such as a smartphone) with a screen such as a touch display (possibly a liquid crystal display screen), wherein a flexible part such as FPC is folded and placed in its internal space for purposes of obtaining a larger screen, etc. With the use of the PSA sheet disclosed herein, even by light press-bonding, the flexible adherend can be fixed in a folded position and continuously held fixed in the same position. By this, the flexible part housed in the folded position in the limited internal space of a mobile electronic device can be precisely in place and stably held fixed with the PSA sheet disclosed herein. Examples of the material placed inside mobile electronics such as those listed above include a material that is polar and rigid, such as polycarbonate and polyimide. With respect to this type of material (a polar and rigid resin material), the PSA sheet disclosed herein can preferably show light-pressure initial adhesion and deformation resistance to a continuous z-axial load.

The development of electronic devices (typically mobile electronics such as smartphones and tablet PCs) having screens such as the touch displays (possibly screens of liquid crystal displays) is geared toward screen maximization and high functionalization at the same time, especially in recent years. As for the screen maximization, as described earlier, measures are taken, such as folding a flexible component such as FPC for installation. On the other hand, with respect to the high functionalization, as new features have taken shapes such as pressure sensors with higher pressure detection sensitivities and face unlock features, to obtain higher-performance and higher-quality products, it is essential to amass circuits including FPC which bring about such products. Examples of the means of amassing circuits include the use of double-faced FPC and multi-layer FPC. However, either way, the rigidity of FPC tends to increase, thereby making it necessary to improve the deformation resistance to a continuous z-axial load as assessed in the z-axial deformation resistance test described later. The PSA sheet according to a preferable embodiment of the art disclosed herein may exhibit excellent deformation resistance in a harsher environment such as the one in the high-repulsion, high-temperature and high-humidity z-axial deformation resistance test described later. Thus, it may conform well to electronic devices bearing aforementioned next-generation touch displays (typically mobile electronics with touch displays, such as smartphones), making itself available for preferable use.

Matters disclosed by this description include the following:

(1) An acrylic PSA composition comprising an acrylic polymer as its base polymer and at least one species selected from tackifier resins and (meth)acrylic oligomers, wherein
the acrylic polymer has a weight average molecular weight higher than $70 \times 10^4$, and
the acrylic polymer has a dispersity (Mw/Mn) below 15.

(2) The acrylic PSA composition according to (1) above, wherein the acrylic polymer includes at least 50% (by weight) alkyl (meth)acrylate having an alkyl group with 1 up to 6 carbon atoms at its ester terminus polymerized therein.

(3) The acrylic PSA composition according to (1) or (2) above, wherein the acrylic polymer includes an acidic group-containing monomer copolymerized therein.

(4) The acrylic PSA composition according to (3) above, wherein the acidic group-containing monomer in the acrylic polymer has a copolymerization ratio lower than 10% by weight.

(5) The acrylic PSA composition according to any of (1) to (4) above, wherein the tackifier resin is included at a ratio lower than 30 parts by weight relative to 100 parts by weight of the acrylic polymer.

(6) The acrylic PSA composition according to any of (1) to (5) above, wherein the (meth)acrylic oligomer is included at a ratio lower than 30 parts by weight relative to 100 parts by weight of the acrylic polymer.

(7) The acrylic PSA composition according to any of (1) to (6) above, including both the tackifier resin and the (meth) acrylic oligomer.

(8) A PSA sheet having an acrylic PSA layer that comprises an acrylic polymer as its base polymer and at least one species selected among tackifier resins and (meth)acrylic oligomers, wherein
the acrylic polymer has a weight average molecular weight higher than $70 \times 10^4$, and
the acrylic polymer has a dispersity (Mw/Mn) below 15.

(9) The PSA sheet according to (8) above, wherein the acrylic polymer includes at least 50% (by weight) alkyl (meth)acrylate having an alkyl group with 1 up to 6 carbon atoms at its ester terminus polymerized therein.

(10) The PSA sheet according to (8) or (9) above, wherein the acrylic polymer includes an acidic group-containing monomer copolymerized therein.

(11) The PSA sheet according to (10) above, wherein the acidic group-containing monomer in the acrylic polymer has a copolymerization ratio lower than 10% by weight.

(12) The PSA sheet according to any of (8) to (11) above, wherein, in the acrylic PSA layer, the tackifier resin is included at a ratio lower than 30 parts by weight relative to 100 parts by weight of the acrylic polymer.

(13) The PSA sheet according to any of (8) to (12) above, wherein, in the acrylic PSA layer, the (meth)acrylic oligomer is included at a ratio lower than 30 parts by weight relative to 100 parts by weight of the acrylic polymer.
(14) The PSA sheet according to any of (8) to (13) above, wherein the acrylic PSA layer comprises both the tackifier resin and the (meth)acrylic oligomer.
(15) The PSA sheet according to any of (8) to (14) above, wherein the PSA layer has a storage modulus at 25° C., G'(25° C.), of 0.15 MPa or greater.
(16) The PSA sheet according to any of (8) to (15) above, wherein the PSA layer has a storage modulus at 85° C., G'(85° C.), of 0.02 MPa or greater.
(17) The PSA sheet according to any of (8) to (16) above, satisfying at least one of the following features: having a 180° peel strength of 8 N/20 mm or greater when determined within one minute after press-bonded at 23° C. at a press-bonding load of 0.1 kg or a 180° peel strength of 8 N/20 mm or greater when determined within one minute after press-bonded at 40° C. at 0.05 MPa for 3 seconds.
(18) The PSA sheet according to any of (8) to (17) above, wherein the PSA layer has a gel fraction of 40% by weight or higher.
(19) The PSA sheet according to any of (8) to (18) above, wherein the acrylic polymer is crosslinked.
(20) The PSA sheet according to any of (8) to (19) above, wherein the acrylic polymer includes at least 50% (by weight) n-butyl acrylate copolymerized therein.
(21) The PSA sheet according to any of (8) to (20) above, wherein the PSA layer comprises the tackifier resin and at least about 50% by weight of the tackifier resin is a phenolic tackifier resin (e.g. terpene-phenol resin).
(22) The PSA sheet according to (21) above, wherein the phenolic tackifier resin comprises a terpene-phenol resin having a hydroxyl value less than about 30 mgKOH/g.
(23) The PSA sheet according to any of (8) to (22) above, wherein the PSA layer has a loss modulus at 25° C., G"(25° C.), of 2.0 MPa or less.
(24) The PSA sheet according to any of (8) to (23) above, wherein the PSA layer is formed from a solvent-based PSA composition or an active energy ray-curable PSA composition.
(25) The PSA sheet according to any of (8) to (24) above, formed as a substrate-free PSA sheet consisting of the PSA layer.
(26) The PSA sheet according to any of (8) to (25) above, formed as an adhesively double-faced PSA sheet having a thickness less than 60 μm.
(27) The PSA sheet according to any of (8) to (26) above, having a manifestation rate above 50% in 23° C. light-pressure initial adhesive strength.
(28) A PSA sheet comprising a PSA layer, wherein
the PSA layer has a storage modulus at 25° C., G'(25° C.), of 0.15 MPa or greater and a storage modulus at 85° C., G'(85° C.), of 0.02 MPa or greater; and
the PSA sheet exhibits a 180° peel strength of 8 N/20 mm or greater, determined at least either within one minute after press-bonded at 23° C. at a press-bonding load of 0.1 kg or within one minute after press-bonded at 40° C. at 0.05 MPa for 3 seconds.
(29) The PSA sheet according to (28) above, wherein the PSA layer has a gel fraction of 40% by weight or higher.
(30) The PSA sheet according to (28) or (29) above, wherein the PSA layer is an acrylic PSA layer comprising an acrylic polymer.
(31) The PSA sheet according to (30) above, wherein the acrylic polymer includes at least 50% (by weight) alkyl (meth)acrylate copolymerized therein, with the alkyl (meth)acrylate having an alkyl group with 1 up to 6 carbon atoms at its ester terminus.
(32) The PSA sheet according to (30) or (31) above, wherein an acidic group-containing monomer is copolymerized in the acrylic polymer.
(33) The PSA sheet according to (32) above, wherein the acidic group-containing monomer is acrylic acid.
(34) The PSA sheet according to (32) or (33) above, wherein the acidic group-containing monomer has a copolymerization ratio below 10% by weight in the acrylic polymer.
(35) The PSA sheet according to any of (30) to (34) above, wherein the acrylic polymer is crosslinked.
(36) The PSA sheet according to any of (30) to (35) above, wherein the acrylic polymer has a weight average molecular weight (Mw) higher than $70 \times 10^4$.
(37) The PSA sheet according to any of (30) to (36) above, wherein the acrylic polymer includes at least 50% (by weight) n-butyl acrylate copolymerized therein.
(38) The PSA sheet according to any of (28) to (37) above, wherein the PSA layer comprises a tackifier resin of which at least about 50% by weight is a phenolic tackifier resin (e.g. a terpene-phenol resin).
(39) The PSA sheet according to (38) above, wherein the phenolic tackifier resin comprises a terpene-phenol resin having a hydroxyl value below about 30 mgKOH/g.
(40) The PSA sheet according to any of (28) to (39) above, wherein the PSA layer exhibits a loss modulus at 25° C., G"(25° C.), of 2.0 MPa or less.
(41) The PSA sheet according to any of (28) to (40) above, wherein the PSA layer is formed from a solution-based PSA composition or an active energy ray-curing PSA composition.
(42) The PSA sheet according to any of (28) to (41) above, formed as a substrate-free PSA sheet consisting of the PSA layer.
(43) The PSA sheet according to any of (28) to (42) above, formed as an adhesively double-faced PSA sheet having a thickness less than 60 μm.
(44) The PSA sheet according to any of (28) to (43) above, having a manifestation rate above 50% in 23° C. light-pressure initial adhesive strength.
(45) The PSA sheet according to any of (8) to (44) above, used for fixing a part in a mobile electronic device.
(46) The PSA sheet according to any of (8) to (45) above, used for fixing a flexible printed circuit.
(47) The PSA sheet according to any of (8) to (46) above, used for fixing a flexible printed circuit placed in a folded position in a mobile electronic device.

EXAMPLES

Several working examples related to the present invention are described below, but the present invention is not intended to be limited to these examples. In the description below, "parts" and "%" are by weight unless otherwise specified.

Experiment 1

Example 1-1

(Preparation of Acrylic Polymer Solution)
In a reaction vessel equipped with a stirrer, thermometer, nitrogen inlet, reflux condenser and addition funnel, were placed 90 parts of 2EHA and 10 parts of AA as monomers as well as ethyl acetate and toluene at about 1:1 (volume ratio) as polymerization solvents. The resulting mixture was stirred under a nitrogen flow for two hours. After oxygen was removed from the polymerization system in such a manner, was added 0.2 part of BPO as a polymerization initiator. Polymerization was carried out at 60° C. for 6 hours to obtain an acrylic polymer solution according to this Example.

(Preparation of PSA Composition)

To the resulting acrylic polymer solution, were added 0.05 part of epoxy-based crosslinking agent (product name TETRAD-C, 1,3-bis(N,N-diglycidylaminomethyl)cyclohexane, available from Mitsubishi Gas Chemical Co., Ltd.) and 20 parts of terpene-phenol resin (product name TAMANOL 803L, available from Arakawa Chemical Industries, Ltd.; softening point: around 145° C. to 160° C.; hydroxyl value: 1 mgKOH/g to 20 mgKOH/g) to 100 parts of acrylic polymer in the solution. The resultant was mixed with stirring to prepare a PSA composition according to this Example.

(Fabrication of PSA Sheet)

As release liners A and B, were obtained polyester release film (product name DIAFOIL MRV, 75 μm thick, Mitsubishi Polyester) treated with release agent to have a release face on one side and polyester release film (product name DIAFOIL MRF, 38 μm thick, Mitsubishi Polyester) treated with release agent to have a release face on one side, respectively. To the release face of release liner A, the PSA composition obtained above was applied and allowed to dry at 100° C. for 2 minutes to form a 50 μm thick PSA layer. The exposed adhesive face of the PSA layer was covered with release liner B with its release face on the PSA layer side to fabricate a substrate-free, adhesively double-faced PSA sheet according to this Example.

Examples 1-2 to 1-5

The monomer compositions were modified as shown in Table 1. Otherwise in the same manner as in Example 1-1, were prepared acrylic polymer solutions according to the respective Examples. Using the resulting acrylic polymers, in the same manner as in Example 1-1, were prepared PSA compositions according to the respective Examples and were fabricated substrate-free, adhesively double-faced PSA sheets according to the respective Examples.

Example 1-6

(Preparation of PSA Composition)

To a monomer mixture of 90 parts of 2EHA and 10 parts of AA, were admixed 0.05 part of 2,2-dimethoxy-1,2-diphenylethane-1-one (available from BASF Corporation, trade name IRGACURE 651) and 0.05 part of 1-hydroxycyclohexyl phenyl ketone (available from BASF Corporation, trade name IRGACURE 184) as photopolymerization initiators. The resulting mixture was irradiated with UV to a viscosity of about 15 Pa·s to obtain a partially-polymerized product (monomer syrup). To this monomer syrup, was added 0.1 part by weight of 1,6-hexanediol diacrylate and uniformly mixed to prepare a PSA composition. The viscosity was determined using a BH viscometer with a rotor (No. 5 rotor) at a frequency of rotation of 10 rpm at a measurement temperature of 30° C.

(Fabrication of PSA Sheet)

The same release liners A (75 μm thick) and B (38 μm thick) were obtained as in Example 1-1. To the release face of release liner A, was applied the PSA composition obtained above. The applied amount of the PSA composition was adjusted so that the resulting PSA layer has a final thickness of 150 μm. Subsequently, release liner B was placed atop the coating of the PSA composition so that its release face was in contact with the coating. The coating was thus blocked from oxygen. The two faces of the coating of the PSA composition were irradiated with UV (product name BLACK LIGHT, available from Toshiba Corporation) having an irradiance of 5 mW/cm$^2$ for 3 minutes to allow polymerization to proceed, whereby the PSA composition was cured to form a PSA layer. A PSA sheet consisting of the PSA layer (i.e. the UV-cured coating) was thus obtained according to this Example. The irradiance was determined with an industrial UV checker (available from Topcon Corporation, product name UVR-T1 with light detector model number UD-T36) with peak sensitivity at 350 nm in wavelength.

Example 1-7

The monomer composition was modified as shown in Table 1. Otherwise in the same manner as in Example 1-6, was fabricated a substrate-free, adhesively double-faced PSA sheet according to this Example.

Example 1-8

(Preparation of Acrylic Polymer Solution)

In a reaction vessel equipped with a stirrer, thermometer, nitrogen inlet, reflux condenser and addition funnel, were placed 93 parts of BA, 7 parts of AA and 0.05 part of 4-hydroxybutyl acrylate (4HBA) as monomers as well as ethyl acetate as a polymerization solvent. The resulting mixture was stirred under a nitrogen flow for two hours. After oxygen was removed from the polymerization system in such a manner, was added 0.1 part of AIBN as a polymerization initiator. Polymerization was carried out at 60° C. for 6 hours to obtain an acrylic polymer solution according to this Example.

(Fabrication of PSA Sheet)

To the resulting acrylic polymer solution, were added 1.5 parts of isocyanate-based crosslinking agent (product name CORONATE L, 75% solution of trimethylol propane/tolylene diisocyanate trimer adduct in ethyl acetate, available from Tosoh Corporation), 0.01 part of epoxy-based crosslinking agent (product name TETRAD-C, 1,3-bis(N,N-diglycidylaminomethyl)cyclohexane, available from Mitsubishi Gas Chemical Co., Ltd.), 15 parts of terpene-phenol resin (product name YS POLYSTAR S-145, available from Yasuhara Chemical Co., Ltd.; softening point: around 145° C.; hydroxyl value: 70 mgKOH/g to 110 mgKOH/g) and 15 parts of (meth)acrylic oligomer to 100 parts of acrylic polymer in the solution. The resultant was mixed with stirring to prepare a PSA composition according to this Example.

Using the resulting PSA composition, in the same manner as in Example 1-1, was fabricated a substrate-free, adhesively double-faced PSA sheet according to this Example.

The (meth)acrylic oligomer used was prepared by the following method: To a reaction vessel equipped with a stirrer, thermometer, nitrogen inlet, reflux condenser and addition funnel, were placed 95 parts of CHMA and 5 parts of AA as well as 10 parts of AIBN as the polymerization initiator and toluene as the polymerization solvent. The resultant was stirred for one hour under a nitrogen flow to remove oxygen from the polymerization system and heated to 85° C. The reaction was carried out for 5 hours to obtain 50% (based on non-volatiles) (meth)acrylic oligomer. The resulting (meth)acrylic oligomer had a Mw of 3600.

Examples 1-9 to 1-12

The monomer compositions were modified as shown in Table 1. Otherwise in the same manner as in Example 1-1, were prepared acrylic polymer solutions according to the respective Examples. Using the resulting acrylic polymers, in the same manner as in Example 1-1, were prepared PSA compositions according to the respective Examples. In Example 1-11, as for the crosslinking agent, in place of the epoxy-based crosslinking agent, was used 3 parts of isocyanate-based crosslinking agent (product name CORONATE L, 75% solution of trimethylol propane/tolylene diisocyanate trimer adduct in ethyl acetate, available from Tosoh Corporation). Using the resulting PSA compositions, in the same manner as in Example 1-1, were fabricated substrate-free, adhesively double-faced PSA sheets according to Examples 1-9 to 1-12.

[23° C. Light-Pressure Initial Adhesive Strength]

The PSA sheet according to each Example was cut 20 mm wide and 100 mm long to fabricate a test piece. The PSA sheet had been backed with 50 μm thick PET film adhered to one of its adhesive faces. It is noted that the backing film is not necessary for measurement of a single-faced PSA sheet on a substrate. In an environment at 23° C. and 50% RH, the adhesive face of the test piece was press-bonded to a stainless steel plate (SUS304BA plate) to fabricate a measurement sample. The press-bonding was achieved with a 0.1 kg roller moved back and forth once. In an environment at 23° C. and 50% RH, using a tensile tester, peel strength (N/20 mm) of the measurement sample was determined at a tensile speed of 300 mm/min at a peel angle of 180°. The peel strength was determined at less than one minute after the test piece was applied to the stainless steel plate. As the tensile tester, Precision Universal Tensile Tester Autograph AG-IS 50N available from Shimadzu Corporation was used, but an equivalent product can be used to obtain comparable measurement results.

[40° C. Light-Pressure Initial Adhesive Strength]

The PSA sheets according to Examples 1-4, 1-5 and 1-9 to 1-12 were cut 20 mm wide and 100 mm long to prepare test pieces. Each of these PSA sheets had been backed with 50 μm thick PET film adhered to one of its adhesive faces. It is noted that the backing film is not necessary for measurement of a single-faced PSA sheet on a substrate. In an environment at 23° C. and 50% RH, using a pressing machine set at a temperature of 40° C., adhesive faces of the test pieces were press-bonded to a stainless steel plate (SUS304BA plate) at 0.05 MPa for 3 seconds to prepare measurement samples. In an environment at 23° C. and 50% RH, using a tensile tester, peel strength (N/20 mm) of these measurement samples was determined at a tensile speed of 300 mm/min at a peel angle of 180°. The peel strength was determined at less than one minute after the test pieces were press-bonded to the stainless steel plate. As the tensile tester, Precision Universal Tensile Tester Autograph AG-IS 50N available from Shimadzu Corporation was used, but an equivalent product can be used to obtain comparable measurement results.

[30-Min Aged Adhesive Strength]

The PSA sheet according to each Example was cut 20 mm wide and 100 mm long to prepare a test piece. The PSA sheet had been backed with 50 μm PET film adhered to one of its adhesive faces. It is noted that the backing film is not necessary for measurement of a single-faced PSA sheet on a substrate. In an environment at 23° C. and 50% RH, the adhesive face of the test piece was press-bonded to a stainless steel plate (SUS304BA plate) to fabricate a measurement sample. The press-bonding was achieved with a 2 kg roller moved back and forth once. The measurement sample was left standing in an environment at 23° C. and 50% RH for 30 min. Subsequently, using a tensile tester, based on JIS Z 0237:2000, peel strength (N/20 mm) was determined at a tensile speed of 300 mm/min at a peel angle of 180° and the resulting value was recorded as the 30-min aged adhesive strength. As the tensile tester, Precision Universal Tensile Tester Autograph AG-IS 50N available from Shimadzu Corporation was used, but an equivalent product can be used to obtain comparable measurement results.

[Z-Axial Deformation Resistance Test]

As shown in FIG. 7(a), a polycarbonate (PC) plate 50 (30 mm long, 10 mm wide, 2 mm thick) and PET film 60 (100 mm long, 10 mm wide, 75 μm thick) were obtained, layered so that PC plate 50 and PET film 60 were aligned at one end of the length direction, and fastened together while the remaining length of PET film 60 protruded off the second end of PC plate 50. They were fastened together with a commercial double-faced PSA tape (a product of Nitto Denko Corporation, No. 5000 NS).

The PSA sheet according to each Example with the two adhesive faces protected with two release liners was cut 3 mm wide and 10 mm long to obtain a PSA sheet test piece 70. PC plate 50 was placed with its surface opposite of the face to which the PET film had been fixed facing upward (i.e. with its PET film-bearing face at the bottom). One release liner was removed from test piece 70. Test piece 70 was placed atop PC plate 50 and adhesively fixed to the top face of PC plate 50 while the length direction of test piece 70 was oriented in the width direction of PC plate 50 and the two lengthwise edges of test piece 70 were aligned with 7 mm and 10 mm lines from the second end of PC plate 50. Test piece 70 was fixed with a 2 kg roller moved back and forth over its top face protected with the second release liner.

Subsequently, in an environment at 23° C. and 50% RH, the second release liner was removed from test piece 70 adhered on PC plate 50. As shown in FIG. 7(b), the 70 mm long free segment of PET film 60 (i.e. the segment protruding off PC plate 50) was folded over to the PC plate 50 side with the second end (free end) of PET film 60 aligned with PSA sheet test piece 70. A 0.1 kg roller was moved back and forth once over PET film 60 to fix the free segment via test piece 70 to the top face of PC plate 50. For 60 minutes, PET film 60 was inspected to see if it peeled off PSA sheet test piece 70. Its 23° C. z-axial deformation resistance was graded according to the adhesive holding power of test piece 70 working in its thickness direction resisting the elastic repulsion of the folded PET film 60. When the adhesion between test piece 70 and PET film 60 was maintained, a grade of "Pass" was given. As shown in FIG. 7(c), when PET film 60 peeled off, a grade of "Fail" was given.

With respect to the PSA sheets according to Examples 1-4, 1-5 and 1-9 to 1-12, 40° C. z-axial deformation resistance was further evaluated. In this evaluation method, the adhesion of PSA sheet test piece 70 and PET film 60 was carried out at 0.05 MPa for 3 seconds using a pressing machine set at a temperature of 40° C. instead of with a 0.1 kg roller moved back and forth once. Otherwise in the same manner as above, their 40° C. z-axial deformation resistance was evaluated.

Unlike conventional repulsion resistance evaluation, this evaluation method allows assessment of light-pressure initial adhesion and deformation resistance relative to a peel load applied essentially solely in the thickness direction (z-axis direction) of the PSA sheet; and furthermore, by chronological observations, continuous deformation resistance can be evaluated as well.

Table 1 shows the monomer composition of the acrylic polymer of each Example as well as the acrylic polymer's Mw and Mw/Mn, the PSA layer's G'(25° C.), G'(85° C.), G'(40° C.), G"(25° C.) (all in MPa) and gel fraction (%), the PSA sheet's 23° C. light-pressure initial adhesive strength (N/20 mm), 40° C. light-pressure initial adhesive strength (N/20 mm) and 30-min aged adhesive strength (N/20 mm) as well as its z-axial deformation resistance test results (at 23° C. and 40° C.).

tially upon application, which may also be why they failed the z-axial deformation resistance tests.

Experiment 2

[Evaluation of Elastic Repulsive Force in z-Axial Deformation Resistance Test]

To further improve the deformation resistance to a continuous z-axial load, influence of the thickness of PET film used in the z-axial deformation resistance test was evaluated. In particular, were obtained 100 mm long, 50 mm wide PET films having thicknesses shown in Table 2. Without using a PSA sheet, but otherwise in the same manner as the z-axial deformation resistance test, each PET film fixed to the PC

TABLE 1

| | | Ex. 1-1 | Ex. 1-2 | Ex. 1-3 | Ex. 1-4 | Ex. 1-5 | Ex. 1-6 | Ex. 1-7 | Ex. 1-8 | Ex. 1-9 | Ex. 1-10 | Ex. 1-11 | Ex. 1-12 |
|---|---|---|---|---|---|---|---|---|---|---|---|---|---|
| Monomer composition | 2EHA | 90 | 89 | 88 | 86 | 84 | 90 | 88 | 0 | 95 | 100 | 30 | 0 |
| | BA | 0 | 0 | 0 | 0 | 0 | 0 | 0 | 93 | 0 | 0 | 70 | 95 |
| | AA | 10 | 11 | 12 | 14 | 16 | 10 | 12 | 7 | 5 | 4 | 3 | 5 |
| | $C_A/C_M$ | 11% | 12% | 14% | 16% | 19% | 11% | 14% | 8% | 5% | 4% | 3% | 5% |
| Molecular weight | Mw ($\times 10^4$) | 94.6 | 114 | 100 | 119 | 108 | — | — | 132 | 132 | 55.0 | 44.0 | 68.0 |
| | Mw/Mn | 19.20 | 21.70 | 15.00 | 16.90 | 16.20 | — | — | 5.85 | 43.60 | 11.50 | 5.00 | 4.40 |
| PSA layer | G'(25° C.) (MPa) | 0.18 | 0.23 | 0.29 | 0.64 | 0.90 | 0.18 | 0.18 | 0.32 | 0.12 | 0.03 | 0.12 | 0.25 |
| | G'(40° C.) (MPa) | — | — | — | 0.18 | 0.21 | — | — | — | — | — | — | — |
| | G'(85° C.) (MPa) | 0.025 | 0.027 | 0.028 | 0.039 | 0.040 | 0.046 | 0.046 | 0.055 | 0.033 | 0.009 | 0.022 | 0.031 |
| | G"(25° C.) (MPa) | 0.20 | 0.25 | 0.37 | 0.89 | 1.31 | — | — | 0.36 | 0.09 | 0.02 | 0.07 | 0.01 |
| | Gel fraction (%) | 55 | 59 | 52 | 56 | 58 | 52 | 57 | 50 | 49 | 29 | 33 | 45 |
| 23° C. light-pressure initial adhesive strength (N/20 mm) | | 11 | 13 | 15 | Not detectable | Not detectable | 10 | 11 | 12 | 5 | 4 | 5 | 5 |
| 40° C. light-pressure initial adhesive strength (N/20 mm) | | — | — | — | >20 | >20 | — | — | — | 6 | 5 | 6 | 6 |
| 30-min aged adhesive strength (N/20 mm) | | 16 | 17 | 19 | >20 | >20 | 16 | 18 | 18 | 11 | 7 | 9 | 10 |
| 23° C. z-axial deformation resistance | | Pass | Pass | Pass | Fail | Fail | Pass | Pass | Pass | Fail | Fail | Fail | Fail |
| 40° C. z-axial deformation resistance | | — | — | — | Pass | Pass | — | — | Pass | Fail | Fail | Fail | Fail |

As shown in Table 1, the PSA sheets according to Examples 1-1 to 1-8 all showed light-pressure initial adhesion at the prescribed press-bonding temperatures and exhibited a passing level of performance in the z-axial deformation resistance test, wherein the PSA layer had storage moduli G'(25° C.)≥0.15 MPa and G'(85° C.)≥0.02 MPa as well as 23° C. or 40° C. light-pressure initial adhesive strength ≥8 N/20 mm. In particular, the PSA sheets according to Examples 1-1 to 1-3, 1-6 and 1-8 with 23° C. light-pressure initial adhesive strength ≥8 N/20 mm showed good initial adhesion by light press-bonding at 23° C. as well as deformation resistance to a continuous z-axial load by light press-bonding at 23° C. As for Examples 1-4 and 1-5, their light-pressure initial adhesive strength was not measurable at 23° C., but they showed good 40° C. light-pressure initial adhesion as well as passing levels of deformation resistance in the z-axial deformation resistance test (40° C.). It is noted that in Examples 1-4 and 1-5, the backing PET film peeled in determining both the 40° C. light-pressure initial adhesive strength and 30-min aged adhesive strength, indicating that they had powerful adhesive strength exceeding 20 N/20 mm. On the other hand, the PSA sheets according to Examples 1-9 to 1-12 showed light-pressure initial adhesive strength below 8 N/20 mm at both 23° C. and 40° C., and failed the z-axial deformation resistance tests conducted upon press-bonding at 23° C. and 40° C. Examples 1-9 to 1-11 with storage moduli G'(25° C.) below 0.15 MPa showed poor deformation resistance iniplate was turned over to form a hair pin shape in a lateral view, with one end (free end) of its length direction (i.e. its free width-wise end) coinciding with the other end (fixed end). The free end of the PET film was released from the force pushing it down and the repulsive force (N/50 mm) created by its return motion was detected by a commercial load cell. The results are shown in Table 2.

TABLE 2

| | Thickness of PET film | | |
|---|---|---|---|
| | 75 μm | 100 μm | 125 μm |
| Repulsive force (N/50 mm) | 0.275 | 0.58 | 1.33 |

As shown in Table 2, with increasing thickness of PET film, the repulsive force created by the return motion of the PET film bent in the hair pin shape increased. In particular, in comparison between 75 μm thick and 125 μm thick PET films, the repulsive force of the 125 μm thick film was about 4.8 times that of the 75 μm thick film.

Experiment 3

Based on the results of Experiment 2, harsher conditions were set for the z-axial deformation resistance test than in Experiment 1 and studies were conducted on PSA sheets capable of resisting the harsher conditions, that is, PSA sheets capable of exhibiting greater deformation resistance.

Example 3-1

In the same manner as Example 1-8 in Experiment 1, was fabricated a substrate-free, adhesively double-faced PSA sheet (50 μm thick) according to this Example.

Examples 3-2 to 3-6

Using the same acrylic polymer (Mw 132×10$^4$, Mw/Mn=5.85) as the one used in Example 3-1 with modified tackifier resin/crosslinking agent compositions, basically in the same manner as Example 3-1, were prepared PSA compositions according to the respective Examples. Using the resulting PSA compositions, in the same manner as Example 3-1, were fabricated substrate-free, adhesively double-faced PSA sheets according to the respective Examples.

The (meth)acrylic oligomer used in Examples 3-2 and 3-3 were the same as the (meth)acrylic oligomer (Mw 3600) used in Example 3-1. In Table 3, Terpene-phenol resin A is a product of Yasuhara Chemical Co., Ltd., under product name YS POLYSTAR S-145 (softening point ~145° C., hydroxyl value 70 mgKOH/g to 110 mgKOH/g); Terpene-phenol resin B is a product of Yasuhara Chemical Co., Ltd., under product name YS POLYSTAR T-115 (softening point ~115° C., hydroxyl value 30 mgKOH/g to 60 mgKOH/g).

[Z-Axial Deformation Resistance Test (High-Repulsion, High-Temperature, High-Humidity)]

As for the PET film to be turned over and fixed with a PSA sheet test piece, was used a 100 mm long, 10 mm wide, 125 μm thick piece of PET film. By the same method as the z-axial deformation resistance test in Experiment 1, in an environment at 23° C. at 50% RH, each PSA sheet test piece and a free end of the PET film were fixed together with a 0.1 kg roller moved back and forth once. The resultant was exposed to an environment at 65° C. at 90% RH. After stored in the same environment for 72 hours, inspection was carried out to check if the bonding was held between the PSA sheet test piece and the PET film. When the bonding was held, the height (μm) the PET film lifted off the PSA sheet test piece was determined, using a microscope. The measurement was carried out three times and the lowest value was recorded. It is noted that the lift-off height includes the thickness of the PSA sheet test piece.

Based on the results of Experiment 2, this test method allows evaluation of resistance (deformation resistance) to an approximately 4.8-fold repulsive force as compared to the z-axial deformation resistance in Experiment 1 in a harsh environment at a high temperature (65° C.) and a high relative humidity (90% RH). A PSA sheet resulting in no peeling of the PET film and a limited lift-off height in this test can be graded to have excellent light-pressure initial adhesion under a peel load applied essentially solely in the thickness direction (z-axis direction) of the PSA sheet and also exhibit notably excellent resistance (deformation resistance) to a continuous peel load applied in the same direction.

For each Example, Table 3 shows the PSA layer's G'(25° C.) in MPa, G"(25° C.) in MPa, tan δ(25° C.) (G"/G'), G'(85° C.) in MPa and tan δ(85° C.) (G"/G') as well as the results of the z-axial deformation resistance test (high-repulsion, high-temperature, high-humidity).

TABLE 3

|  |  | Ex. 3-1 | Ex. 3-2 | Ex. 3-3 | Ex. 3-4 | Ex. 3-5 | Ex. 3-6 |
| --- | --- | --- | --- | --- | --- | --- | --- |
| Acrylic polymer (parts) | BA93/AA7/4HBA0.05 | 100 | 100 | 100 | 100 | 100 | 100 |
| Tackifier resin (parts) | Terpene-phenol resin A | 15 | 15 | 0 | 15 | 0 | 0 |
|  | Terpene-phenol resin B | 0 | 0 | 15 | 0 | 15 | 0 |
| (Meth)acrylic oligomer (parts) | CHMA95/AA5 | 15 | 15 | 15 | 0 | 0 | 0 |
| Crosslinking agent (parts) | Isocyanate | 1.5 | 0.7 | 0.7 | 0.7 | 0.7 | 2 |
|  | Epoxy | 0.01 | 0.01 | 0.01 | 0 | 0 | 0 |
| PSA layer | G'(25° C.) (MPa) | 0.33 | 0.30 | 0.22 | 0.20 | 0.15 | 0.16 |
|  | G"(25° C.) (MPa) | 0.36 | 0.31 | 0.18 | 0.14 | 0.08 | 0.05 |
|  | tan δ(25° C.) | 1.09 | 1.03 | 0.82 | 0.70 | 0.55 | 0.29 |
|  | G'(85° C.) (MPa) | 0.055 | 0.057 | 0.060 | 0.060 | 0.062 | 0.085 |
|  | tan δ(85° C.) | 0.24 | 0.24 | 0.25 | 0.26 | 0.23 | 0.20 |
| Z-axial deformation resistance (strong repulsion, 65° C., 90% RH) (μm) |  | 144 | 244 | 325 | 517 | 502 | Peeled off |

As shown in Table 3, in the z-axial deformation resistance test under high-repulsion, high-temperature and high-humidity conditions, the PSA sheets according to Examples 3-1 to 3-5 showed excellent deformation resistance to the continuous z-axial load when lightly press-bonded at 23° C., with each PSA sheet having a PSA layer that included the acrylic polymer with Mw>70×10$^4$ and dispersity (Mw/Mn) <15 as well as at least one species selected from tackifier resins and (meth)acrylic oligomers. In other words, without the need of high-temperature thermal press-bonding, light-pressure initial adhesion and deformation resistance to the continuous z-axial load were obtained together; and furthermore, excellent deformation resistance was obtained even in the harsh environment high in repulsion, temperature and humidity. In particular, with respect to Examples 3-1 to 3-3 using both tackifier resin and (meth)acrylic oligomer, especially great deformation resistance was obtained as the lift-off height was limited to or below 400 μm in the high-repulsion, high-temperature and high-humidity z-axial deformation resistance test. On the other hand, the PSA sheet of Example 3-6 not using tackifier resin or (meth) acrylic oligomer was not able to endure the z-axial deformation load as the PET film peeled off during the z-axial deformation resistance test (high repulsion, high temperature, high humidity).

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1, 2, 3, 4, 5, 6 PSA sheets
10 substrate
21, 22 PSA layers
31, 32 release liners

What is claimed is:

1. A pressure-sensitive adhesive sheet having an acrylic pressure-sensitive adhesive layer that comprises an acrylic polymer as its base polymer and at least a tackifier resin or a (meth)acrylic oligomer, wherein
the acrylic polymer is a polymer of a starting monomer mixture that comprises an alkyl (meth)acrylate in an amount of 85% by weight or higher, the alkyl (meth)acrylate is a compound represented by the formula (1)

$$CH_2=C(R^1)COOR^2 \qquad (1)$$

wherein $R^1$ is a hydrogen atom or a methyl group, and $R^2$ is an acyclic alkyl group having 1 to 6 carbon atoms,
the acrylic polymer has a weight average molecular weight of $110 \times 10^4$ or higher,
the acrylic polymer has a dispersity (Mw/Mn) below 15,
the pressure-sensitive adhesive layer has a gel fraction of 40% by weight or higher, and
the pressure-sensitive adhesive layer has a storage modulus at 85° C., G'(85° C.), of 0.02 MPa or greater.

2. The pressure-sensitive adhesive sheet according to claim 1, wherein
the pressure-sensitive adhesive layer has a storage modulus at 25° C., G'(25° C.), of 0.15 MPa or greater; and
the pressure-sensitive adhesive sheet satisfies at least one of the following features: having a 180° peel strength of 8 N/20 mm or greater when determined within one minute after press-bonded at 23° C. at a press-bonding load of 0.1 kg or a 180° peel strength of 8 N/20 mm or greater when determined within one minute after press-bonded at 40° C. at 0.05 MPa for 3 seconds.

3. The pressure-sensitive adhesive sheet according to claim 1, wherein the acrylic polymer includes an acidic group-containing monomer copolymerized therein.

4. The pressure-sensitive adhesive sheet according to claim 3, wherein the acidic group-containing monomer is acrylic acid.

5. The pressure-sensitive adhesive sheet according to claim 3, wherein the acidic group-containing monomer has a copolymerization ratio below 10% by weight in the acrylic polymer.

6. The pressure-sensitive adhesive sheet according to claim 1, wherein the acrylic polymer is crosslinked.

7. The pressure-sensitive adhesive sheet according to claim 1, used for fixing parts in mobile electronics.

8. The pressure-sensitive adhesive sheet according to claim 1, used for fixing a flexible printed circuit.

9. The pressure-sensitive adhesive sheet according to claim 1, wherein the pressure-sensitive adhesive layer has a storage modulus at 85° C., G'(85° C.), of 0.03 MPa or greater.

10. The pressure-sensitive adhesive sheet according to claim 1, wherein the pressure-sensitive adhesive layer has a storage modulus at 85° C., G'(85° C.), of 0.04 MPa or greater.

11. The pressure-sensitive adhesive sheet according to claim 1, wherein the pressure-sensitive adhesive layer has a storage modulus at 85° C., G'(85° C.), of 0.05 MPa or greater.

12. The pressure-sensitive adhesive sheet according to claim 1, wherein the pressure-sensitive adhesive layer has the gel fraction of 40% by weight or higher and 70% or lower.

13. The pressure-sensitive adhesive sheet according to claim 1, wherein the pressure-sensitive adhesive layer comprises the (meth)acrylic oligomer, the (meth)acrylic oligomer has a weight average molecular weight of 1,000 or larger and smaller than 30,000, and the (meth)acrylic oligomer comprises, as a (meth)acrylate monomer, an alicyclic hydrocarbon group-containing (meth)acrylate in an amount higher than 50% by weight.

14. The pressure-sensitive adhesive sheet according to claim 1, wherein
the pressure-sensitive adhesive sheet consists of the pressure-sensitive adhesive layer, or the pressure-sensitive adhesive sheet comprises a substrate to support the pressure-sensitive adhesive layer,
the substrate is a resin film, a foam film, paper, a fabric, a metal foil, or a composite thereof, and
the foam film is formed from a foam material selected from the group consisting of a polyester-based resin foam, a polyvinyl chloride-based resin foam, a vinyl acetate-based resin foam, a polyphenylene sulfide resin foam, an amide-based resin foam, a polyimide resin foam, a polyether ether ketone foam, a styrene-based resin foam, a urethane-based resin foam and a rubber-based resin foam.

15. The pressure-sensitive adhesive sheet according to claim 1, wherein
the pressure-sensitive adhesive sheet consists of the pressure-sensitive adhesive layer, or the pressure-sensitive adhesive sheet comprises a substrate to support the pressure-sensitive adhesive layer,
the substrate is a resin film, a foam film, paper, a fabric, a metal foil, or a composite thereof,
the resin film is a polyester-based resin film, a polyvinylic resin film, a vinyl acetate-based resin film, a polyimide-based resin film, a polyamide-based resin film, a fluororesin film, cellophane, or a rubber-based film, and
the foam film is formed from a foam material selected from the group consisting of a polyester-based resin foam, a polyvinyl chloride-based resin foam, a vinyl acetate-based resin foam, a polyphenylene sulfide resin foam, an amide-based resin foam, a polyimide resin foam, a polyether ether ketone foam, a styrene-based resin foam, a urethane-based resin foam and a rubber-based resin foam.

* * * * *